United States Patent
Montoya

(10) Patent No.: US 11,938,448 B2
(45) Date of Patent: Mar. 26, 2024

(54) IMPELLER DRIVEN HOLLOW FIBER MEMBRANE SEPARATOR

(71) Applicant: MedArray, Inc., Ann Arbor, MI (US)

(72) Inventor: Jean Patrick Montoya, Ann Arbor, MI (US)

(73) Assignee: MedArray, Inc., Ann Arbor, MI (US)

( * ) Notice: Subject to any disclaimer, the term of this patent is extended or adjusted under 35 U.S.C. 154(b) by 0 days.

(21) Appl. No.: 17/964,336

(22) Filed: Oct. 12, 2022

(65) Prior Publication Data

US 2023/0114098 A1   Apr. 13, 2023

Related U.S. Application Data

(60) Provisional application No. 63/262,483, filed on Oct. 13, 2021.

(51) Int. Cl.
| | | |
|---|---|---|
| *B01D 63/04* | (2006.01) | |
| *B01D 63/02* | (2006.01) | |

(52) U.S. Cl.
CPC .......... *B01D 63/04* (2013.01); *B01D 63/031* (2022.08); *B01D 2313/08* (2013.01); *B01D 2313/105* (2013.01)

(58) Field of Classification Search
CPC .. B01D 63/04; B01D 63/031; B01D 2313/08; B01D 2313/105; B01D 63/02;

(Continued)

(56) References Cited

U.S. PATENT DOCUMENTS 4,421,529 A * 12/1983 Revak ................. C01B 13/0255
                                                              96/8
5,376,334 A * 12/1994 Haworth ................ B01D 63/02
                                                              422/46

(Continued)

FOREIGN PATENT DOCUMENTS

| DE | 102005053334 A1 | 5/2007 |
| EP | 1944077 A1 * | 7/2008 |
| KR | 20160133253 | * 11/2016 |

OTHER PUBLICATIONS

English language machine translation of KR20160133253, 7 pages, No Date.*

(Continued)

*Primary Examiner* — Pranav N Patel
(74) *Attorney, Agent, or Firm* — DINSMORE & SHOHL LLP

(57) ABSTRACT

Disclosed herein are membrane separator modules. The membrane separator module includes a plurality of hollow fibers arranged as an annular shaped bundle defining a bore, wherein each of the plurality of hollow fibers includes a lumen; a first manifold attached to a first end of the plurality of hollow fibers and a second manifold attached to a second end of the plurality of hollow fibers; a fluid inlet port disposed on the first manifold and in fluid communication with a first interior volume thereof, and a fluid outlet port disposed on the second manifold and in fluid communication with a second interior volume thereof, wherein a fluid path is defined through the inlet port, the first interior volume, the lumens of the plurality of hollow fibers, the second interior volume, and the outlet port; and an impeller operable to drive fluid flow over exterior surfaces of the plurality of hollow fibers.

19 Claims, 11 Drawing Sheets

(58) Field of Classification Search
CPC .... B01D 65/02; B01D 65/08; B01D 2313/23; B01D 2313/26; B01D 2315/06; B01D 2321/2041; B01D 2313/086; B01D 2321/00; B01D 2321/30; A61M 2206/20; A61M 60/216; A61M 60/221; A61M 60/226; A61M 60/237

See application file for complete search history.

(56) References Cited

U.S. PATENT DOCUMENTS

| | | | |
|---|---|---|---|
| 5,395,525 A * | 3/1995 | Takano | B01D 65/08 210/321.89 |
| 2002/0162455 A1* | 11/2002 | Bikson | B01D 53/22 96/8 |
| 2008/0199357 A1* | 8/2008 | Gellman | A61M 1/3623 604/6.14 |
| 2016/0256619 A1* | 9/2016 | Throckmorton | A61M 60/82 |
| 2023/0087461 A1 | 3/2023 | Bongartz | |

OTHER PUBLICATIONS

English language machine translation of EP1944077A1, 8 pages, No Date.*

* cited by examiner

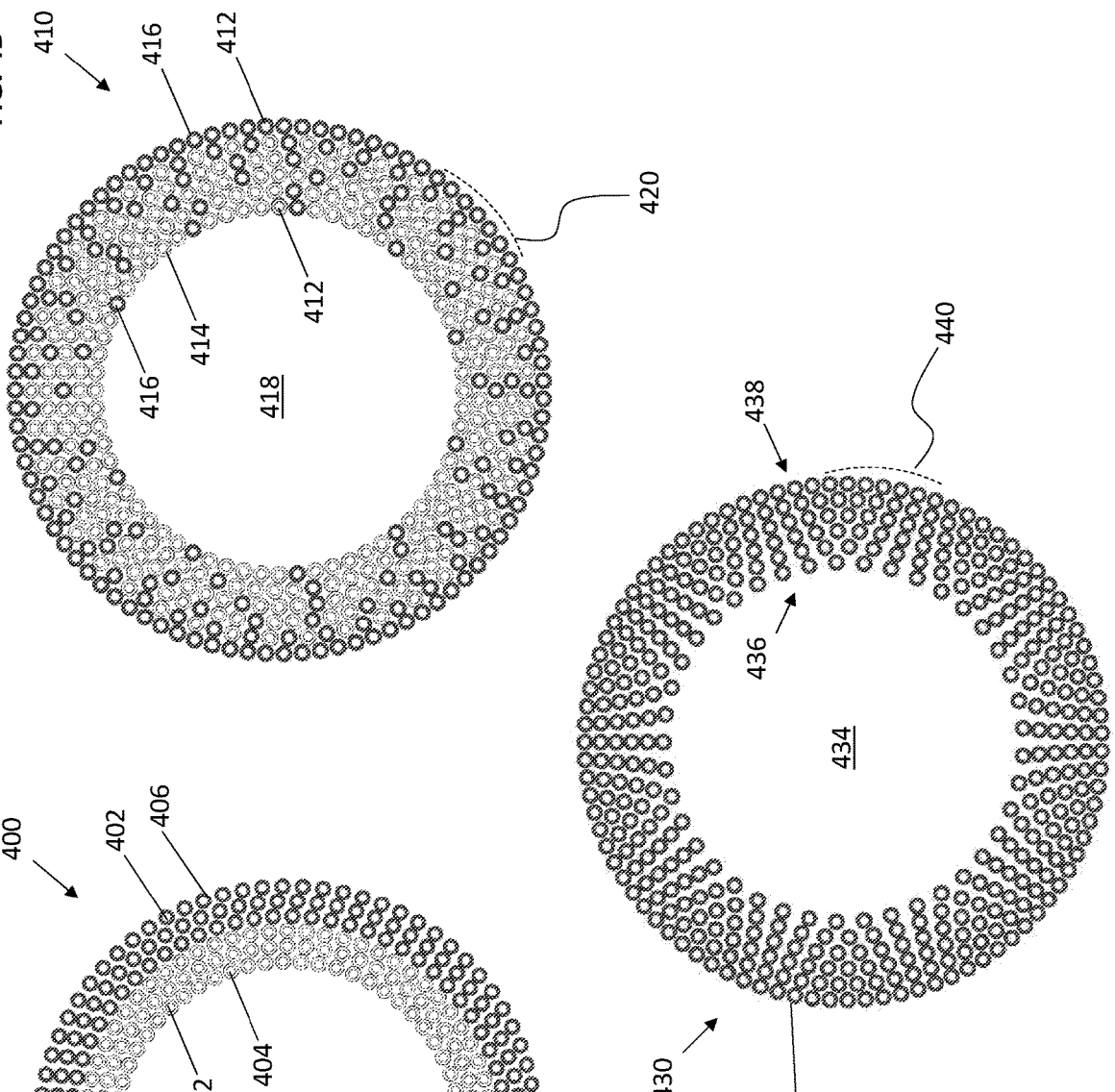

IMPELLER DRIVEN HOLLOW FIBER MEMBRANE SEPARATOR

CROSS-REFERENCE TO RELATED APPLICATION

This application claims priority to provisional application No. 63/262,483, filed Oct. 13, 2021, which is hereby incorporated by reference in its entirety.

TECHNICAL FIELD

The present disclosure relates to membrane separation, more particularly, to membrane separator modules.

BACKGROUND

Membrane separator modules may include a plurality of hollow fibers. The plurality of hollow fibers are semipermeable membranes which can enable mass transfer and separations across the membrane when fluids come in contact with either the inside or the outside of the hollow fiber and a pressure or concentration difference (such as a gas partial pressure difference, osmotic pressure difference, and static pressure difference) exists across the membrane. For example, when a gas is in contact or flowing inside a gas permeable hollow fiber and a liquid is in contact or flowing outside the gas permeable hollow fiber, gas may permeate across the gas permeable hollow fiber wall into the liquid.

Membrane separator modules are utilizable to perform membrane separations in numerous types of fluids, such as gases, liquids, and combinations thereof, including liquids with dissolved gases, as well as liquids and gases with membrane excludable elements in them such as, but not limited to molecules, proteins, cells, bacteria, viruses, organisms, ions, and substantially solid elements. For example, membrane separations such as, but not limited to, dialysis, filtration processes such as particulate filtration, microfiltration, ultrafiltration, nanofiltration, hyperfiltration, tangential flow filtration (TFF), reverse osmosis, and forward osmosis, can be accomplished using membrane separator modules having hollow fiber membranes suitable for the intended separation.

Membrane separator modules may utilized to control dissolved gases in a media fluid contained in a bioreactor reservoir, vessel, or tank to ensure that the organisms therein remain alive and proliferate. FIG. 1 illustrates a membrane separator module 100 in communication with a bioreactor tank 102 that contains a fluid media 104, wherein the membrane separator module 100 is operable to control dissolved gases in the fluid media 104. The membrane separator module 100 includes a plurality of hollow fibers described above.

The bioreactor tank 102 includes an outlet 106 and an inlet 108. The membrane separator module 100 includes a fluid media inlet 110 that is in communication with the outlet 106 of the bioreactor tank 102 via a first conduit 114, and fluid media outlet 112 that is in communication with the inlet 108 of the bioreactor tank 102 via a second conduit 116. The fluid media inlet 110 of the membrane separator module 100 is in communication with a first end of the hollow fibers and the fluid media outlet 112 is in communication with a second end of the hollow fibers contained within the membrane separator module 100, such that fluid introduced at the fluid media inlet 110 flows through the hollow fibers and exits the membrane separator module 100 at the fluid media outlet 112. The membrane separator module 100 thus draws the media fluid 104 from an outlet 106 in the bioreactor tank 102, transmits the media fluid 104 through the plurality of hollow fibers arranged within the membrane separator module 100, and then reinfuses it back into the bioreactor tank 102 at the inlet 108. The membrane separator module 100 also includes a gas inlet 120 and a gas outlet 122 that communicate with an interior volume of the membrane separator module 100 through which the plurality of hollow fibers extend, but that interior volume is not in communication with either the fluid media inlet 110 or the fluid media outlet 112, such that a gas mixture 124 introduced through the gas inlet 120 flows over exterior surfaces of the plurality of hollow fibers and is vented out of the interior volume through the gas outlet 122. Due to the permeability of the hollow fibers, gas transfer may occur between the fluid media 104 flowing through the hollow fibers and the gas mixture flowing over external surfaces of the hollow fibers.

With these applications, however, a pump 118 is needed to drive the fluid media 104 through the first conduit 114, through the plurality of hollow fibers arranged within the membrane separator module 100, and back into the bioreactor tank 102 via the second conduit 116.

Thus, existing membrane separation processes that enable gas transfer to the media fluid 104 in the bioreactor tank 102 would require several components external to the bioreactor tank 102 in addition to the membrane separator module 100, such as the various tubing or conduits 114, 116, as well as the pump 118. Also, the organisms suspended in the media fluid 104 contained within the bioreactor tank 102 may be susceptible to shear and sudden pressure changes, which occur when using the pump 118 to drive the media fluid 104 though the conduits 114, 116 and the membrane separator module 100. Further, the conduits 114, 116 and membrane separator module present additional resistance to flow, thereby requiring that the pump 118 generate higher pressures and shear to drive the media fluid 104 through these components, and such additional exposure to shear and high pressures that may be necessary to drive the media fluid 104 through the conduits 114, 116 and the membrane separator module 100 are detrimental to the organisms suspended in the media fluid 104.

Also, in membrane separation applications where the bioreactor tank 102 holds a gas, a blower or compressor may be necessary to drive the gas through the conduits 114, 116 and the membrane separator module 100, thus requiring more energy and larger equipment, especially if the membrane separator module 100 presents high resistance to flow. Furthermore, installation and use of the external components can be cumbersome, require extra space and hardware to mount. Moreover, the conduits 114, 116 can be kinked, separate at connections (e.g., at the outlet 106, the inlet 108, the fluid media inlet 110, the fluid media outlet 112, etc.), and develop leaks.

SUMMARY

Embodiments herein are directed towards membrane separation modules. In one embodiment, a membrane separator module includes: a plurality of hollow fibers arranged as an annular shaped bundle having a first end and a second end opposite the first end, the annular shaped bundle defining a bore extending between the first end and the second end, wherein each of the plurality of hollow fibers includes a lumen extending between the first end and the second end; a first manifold attached to the plurality of hollow fibers at the first end of the annular shaped bundle and a second manifold attached to the plurality of hollow fibers at the second end of the annular shaped bundle, the first manifold having a first interior volume that is in fluid communication with the lumens of the plurality of hollow fibers and the second manifold having a second interior volume that is in fluid communication with the lumens of the plurality of hollow fibers, the first manifold and the second manifold each being annular shaped and having an opening, with the opening of the first manifold in communication with the first end of the bore and the opening of the second manifold in communication with the second end of the bore; a fluid inlet port disposed on the first manifold and in fluid communication with the first interior volume thereof, and a fluid outlet port disposed on the second manifold and in fluid communication with the second interior volume thereof, wherein a fluid path is defined through the inlet port, the first interior volume, the lumens of the plurality of hollow fibers, the second interior volume, and the outlet port; and an impeller at least partially arranged in the bore of the annular shaped bundle and/or in either or both of the openings of the first manifold and the second manifold, the impeller operable to drive fluid flow exterior the plurality of hollow fibers.

In some embodiments, the membrane separator module may further include a motor operatively connected to a shaft of the impeller for causing rotation of the impeller. In some of these embodiments, the impeller includes a plurality of vanes arranged in the opening of the first manifold, and in some of these embodiments, the vanes are arranged to drive fluid flow into the bore, through the opening of the first manifold.

In some embodiments, the impeller includes a plurality of vanes arranged in the bore, and in some of these embodiments, the vanes are arranged to drive fluid flow radially outward through the plurality of hollow fibers from the bore. In some embodiments, the impeller includes a shaft and a rotor magnet connected to the shaft, and the membrane separator module further comprises: a magnetic stator provided proximate the first manifold or the second manifold, wherein the magnetic stator surrounds the rotor magnet. In some of these embodiments, the membrane separator module further includes a cover provided between the magnetic stator and the rotor magnet, and in some of these embodiments, a magnetic stator is provided proximate the second manifold, and the cover is integral with or sealed to the second manifold. In some embodiments, the membrane separator module further includes a liner connected to the cover and provided between the magnetic stator and either the first manifold or the second manifold.

In some embodiments, the plurality of hollow fibers comprises at least a first type of hollow fibers and a second type of hollow fibers. In some of these embodiments, the first type of hollow fibers are arranged concentrically within the second type of hollow fibers, wherein the second type of hollow fibers are positioned radially outward from the first type of hollow fibers. In some of these embodiments, when evaluated in cross-section, the first type of hollow fibers and the second type of hollow fibers are uniformly distributed within the annular shaped bundle. In some of these embodiments, when evaluated in cross-section, a density of the second type of hollow fibers organized within first type of hollow fibers varies when evaluated in a radial direction from the bore. In some of these embodiments, the density of the second type organized within first type of hollow fibers increases along the radial direction. In some embodiments, when evaluated in cross-section, a density of the plurality of hollow fibers increases along a radial direction from the bore.

In some embodiments, the membrane separator module further includes a shroud extending between the first manifold and the second manifold, the shroud having an outer cover and an inner cover, the outer cover disposed over an outer side of the annular shaped bundle and the inner cover disposed within the bore and over an inner side of the annular shaped bundle. In some embodiments, the membrane separator module further includes comprising a baffle structure that defines an interior flow channel, the baffle structure is sealed within either the first opening of the first manifold or the second opening of the second manifold such that the baffle structure extends through the bore towards the second manifold or the first manifold, respectively, wherein the interior flow channel directs fluid flow into contact with the impeller which is provided proximate the second manifold or the first manifold.

In another embodiment, a membrane separator module includes: a plurality of hollow fibers arranged as an annular shaped bundle having a first end and a second end opposite the first end, the annular shaped bundle defining a bore extending between the first end and the second end, wherein each of the plurality of hollow fibers includes a lumen extending between the first end and the second end; a first manifold attached to the plurality of hollow fibers at the first end of the annular shaped bundle and a second manifold attached to the plurality of hollow fibers at the second end of the annular shaped bundle, the first manifold having a first interior volume that is in fluid communication with the lumens of the plurality of hollow fibers and the second manifold having a second interior volume that is in fluid communication with the lumens of the plurality of hollow fibers, the first manifold and the second manifold each being annular shaped and having an opening, with the opening of the first manifold in communication with the first end of the bore and the opening of the second manifold in communication with the second end of the bore; a fluid inlet port disposed on the first manifold and in fluid communication with the first interior volume thereof, and a fluid outlet port disposed on the second manifold and in fluid communication with the second interior volume thereof, wherein a fluid path is defined through the inlet port, the first interior volume, the lumens of the plurality of hollow fibers, the second interior volume, and the outlet port; an axial flow impeller comprising at least one vane arranged in the opening of the first manifold and a shaft connected to the at least one vane, the shaft extending through the bore towards the second manifold; a drive unit comprising a magnetic stator and a rotor magnet connected to an end of the shaft opposite the at least one vane, the magnetic stator positioned proximate to the second manifold and surrounding the rotor magnet; and a cover sealed to the second manifold to thereby cover the opening of the second manifold, the cover comprising a portion that is provided between the magnetic stator and the rotor magnet.

In yet another embodiment, a membrane separator module includes: a plurality of hollow fibers arranged as an annular shaped bundle having a first end and a second end opposite the first end, the annular shaped bundle defining a bore extending between the first end and the second end, wherein each of the plurality of hollow fibers includes a lumen extending between the first end and the second end; a first manifold attached to the plurality of hollow fibers at the first end of the annular shaped bundle and a second manifold attached to the plurality of hollow fibers at the second end of the annular shaped bundle, the first manifold having a first interior volume that is in fluid communication with the lumens of the plurality of hollow fibers and the second manifold having a second interior volume that is in fluid communication with the lumens of the plurality of hollow fibers, the first manifold and the second manifold each being annular shaped and having an opening, with the opening of the first manifold in communication with the first end of the bore and the opening of the second manifold in communication with the second end of the bore; a fluid inlet port disposed on the first manifold and in fluid communication with the first interior volume thereof, and a fluid outlet port disposed on the second manifold and in fluid communication with the second interior volume thereof, wherein a fluid path is defined through the inlet port, the first interior volume, the lumens of the plurality of hollow fibers, the second interior volume, and the outlet port; a baffle structure that defines an interior flow channel, the baffle structure sealingly provided within the opening of the first manifold and extending through the bore towards the second manifold and terminating at an end; an radial flow impeller comprising at least one vane arranged in the bore proximate to the second manifold; a drive unit comprising a magnetic stator and a rotor magnet connected to the at least one vane, the magnetic stator positioned proximate to the second manifold and surrounding the rotor magnet; and a cover sealed to the second manifold to thereby cover the opening of the second manifold, the cover being provided between the magnetic stator and the rotor magnet, the cover having an upper surface that faces the first manifold, the end of the baffle structure being spaced from the upper surface of the cover, wherein the interior flow channel directs fluid flow into contact with the impeller which is provided in-between the upper surface and the end.

Additional features and advantages of the membrane separation modules described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1:
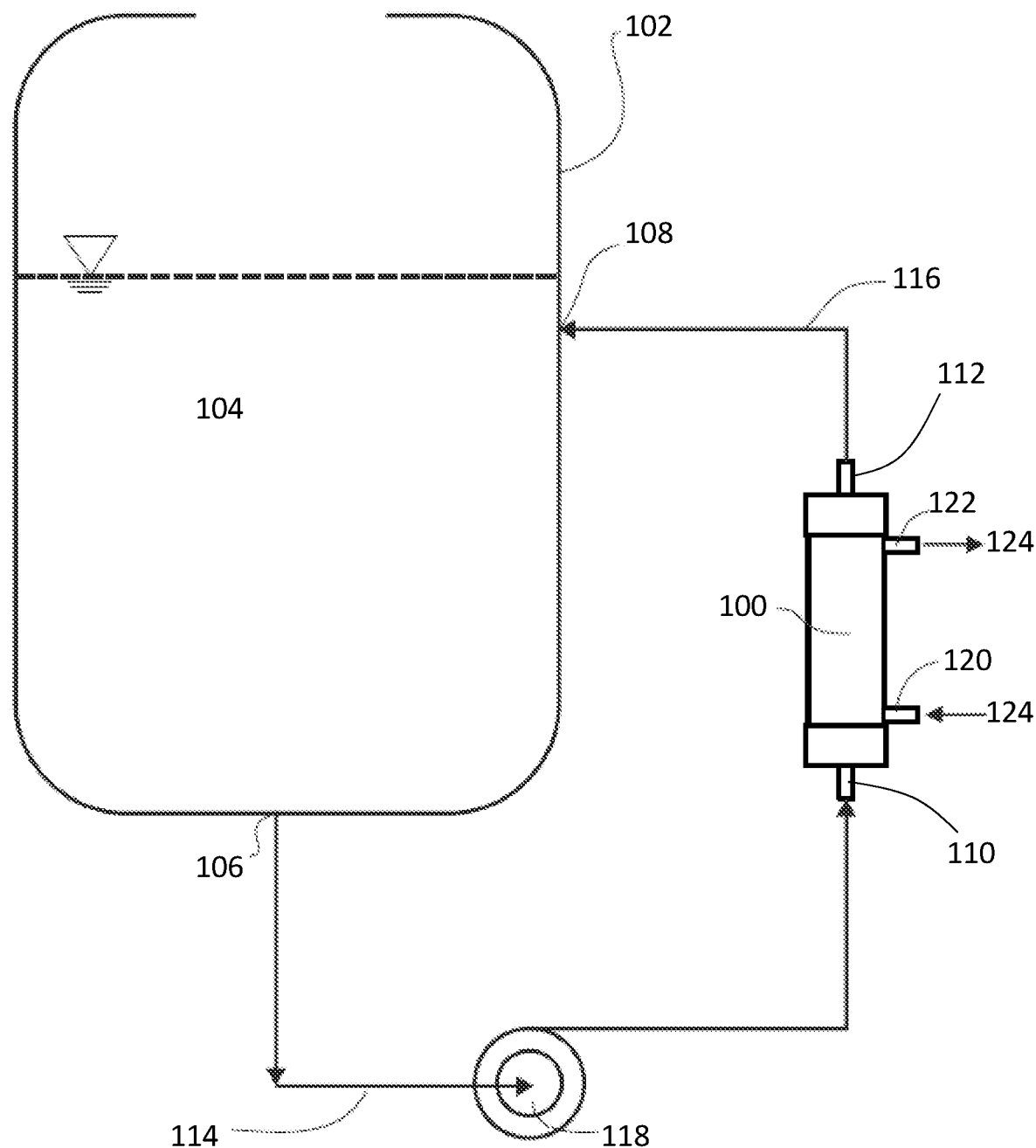
FIG. 1 schematically illustrates a membrane separation application comprising a membrane separator module that is in communication with a bioreactor tank, wherein the membrane separator module is operable to control dissolved gases in a fluid media contained in the bioreactor tank and a pump is utilized to drive the fluid media through the membrane separator module.
Figure 2:
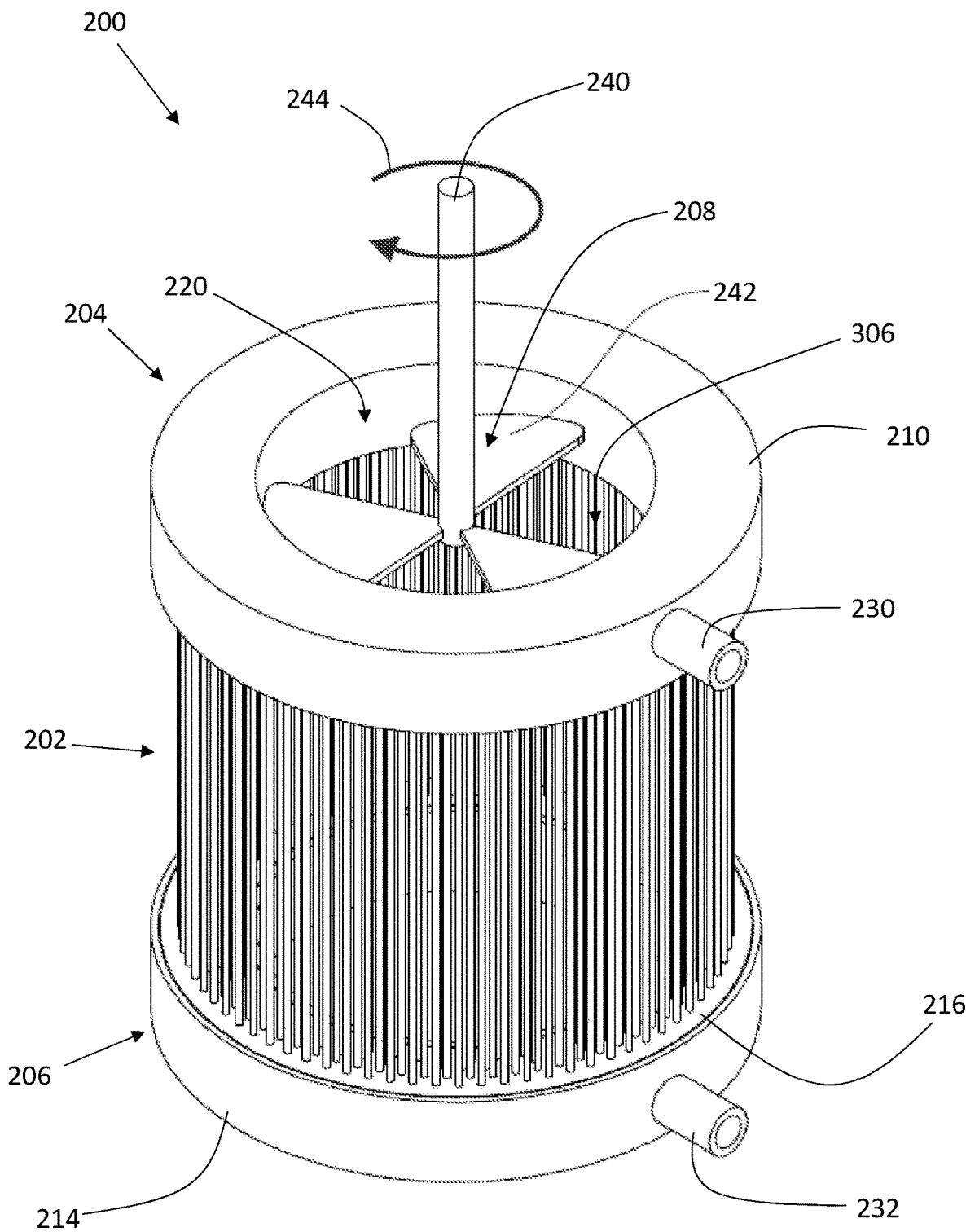
FIG. 2 is an isometric view of a membrane separator module, according to one or more embodiments shown and described herein.
Figure 3B:
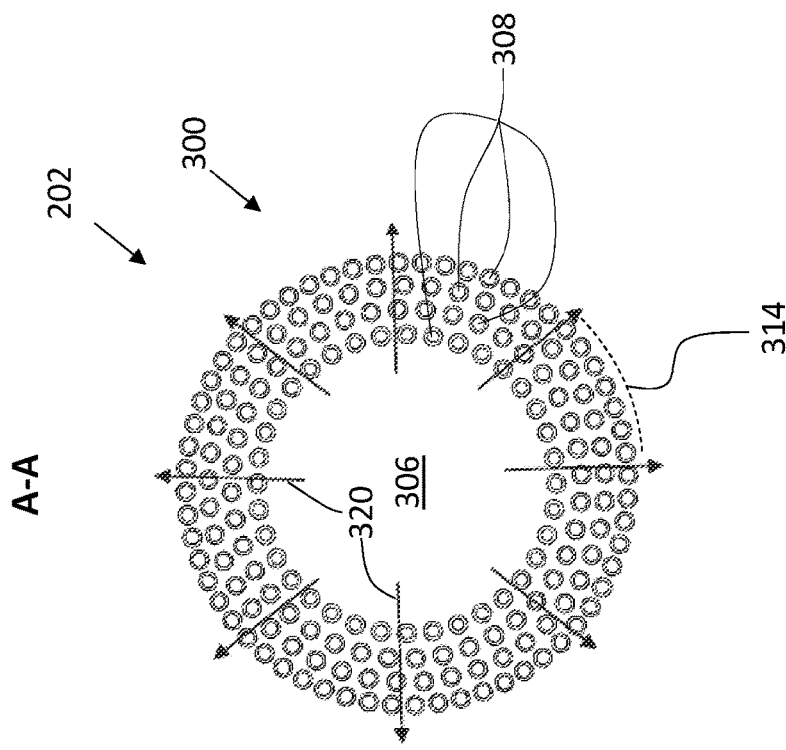
FIG. 3A is an isometric view of a plurality of hollow fibers of the membrane separator module of FIG. 2.
Figure 3A:
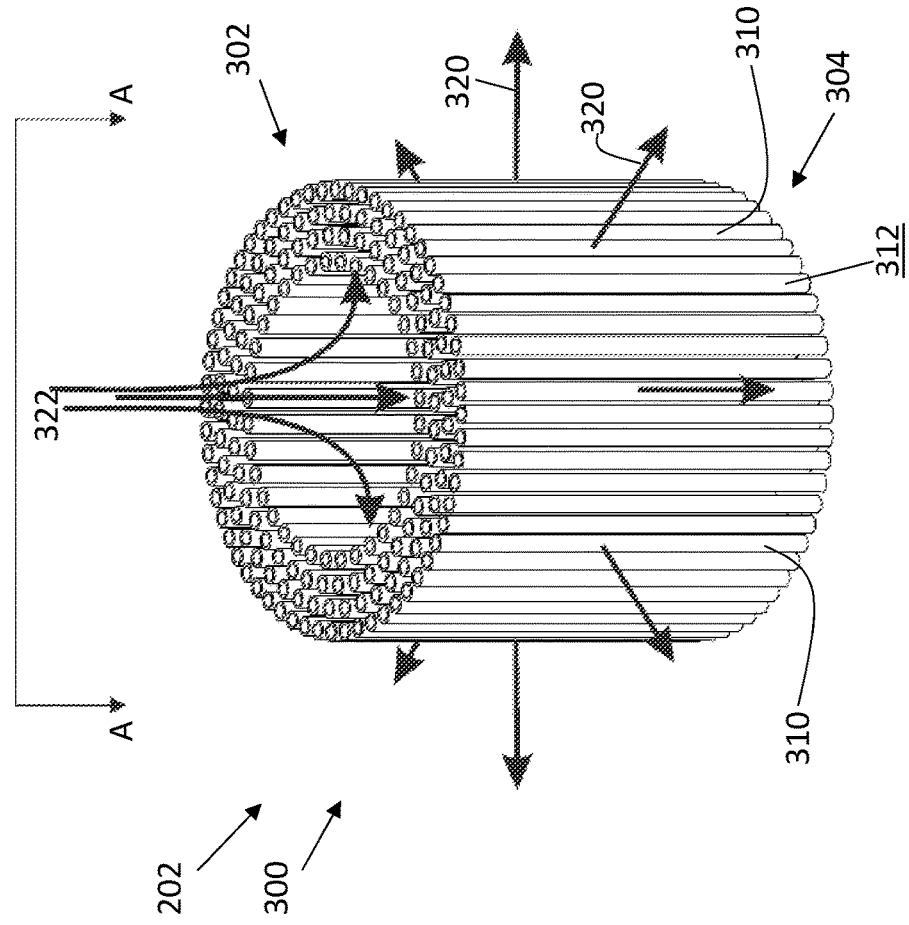
Figure 5:
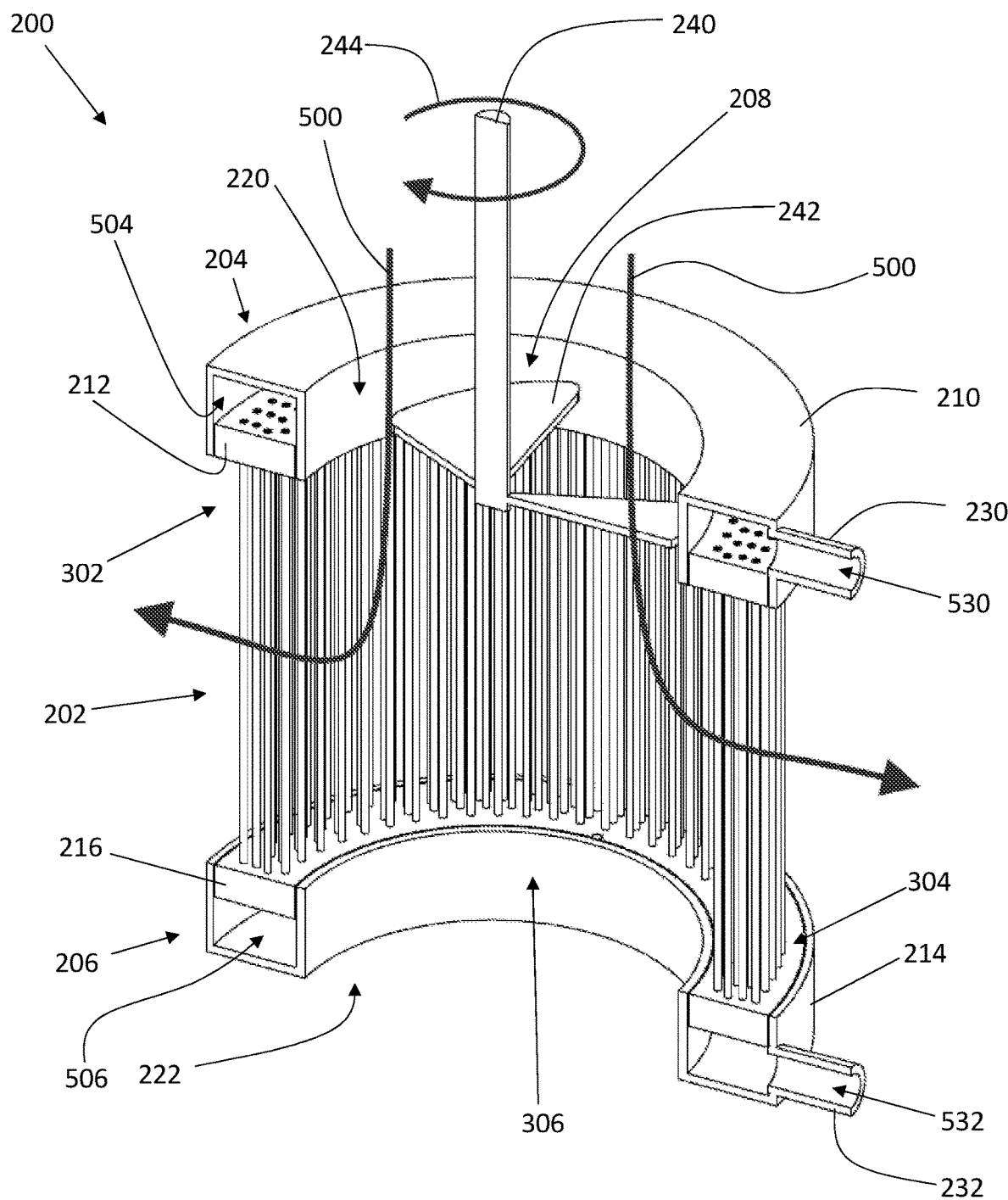
Figure 6:
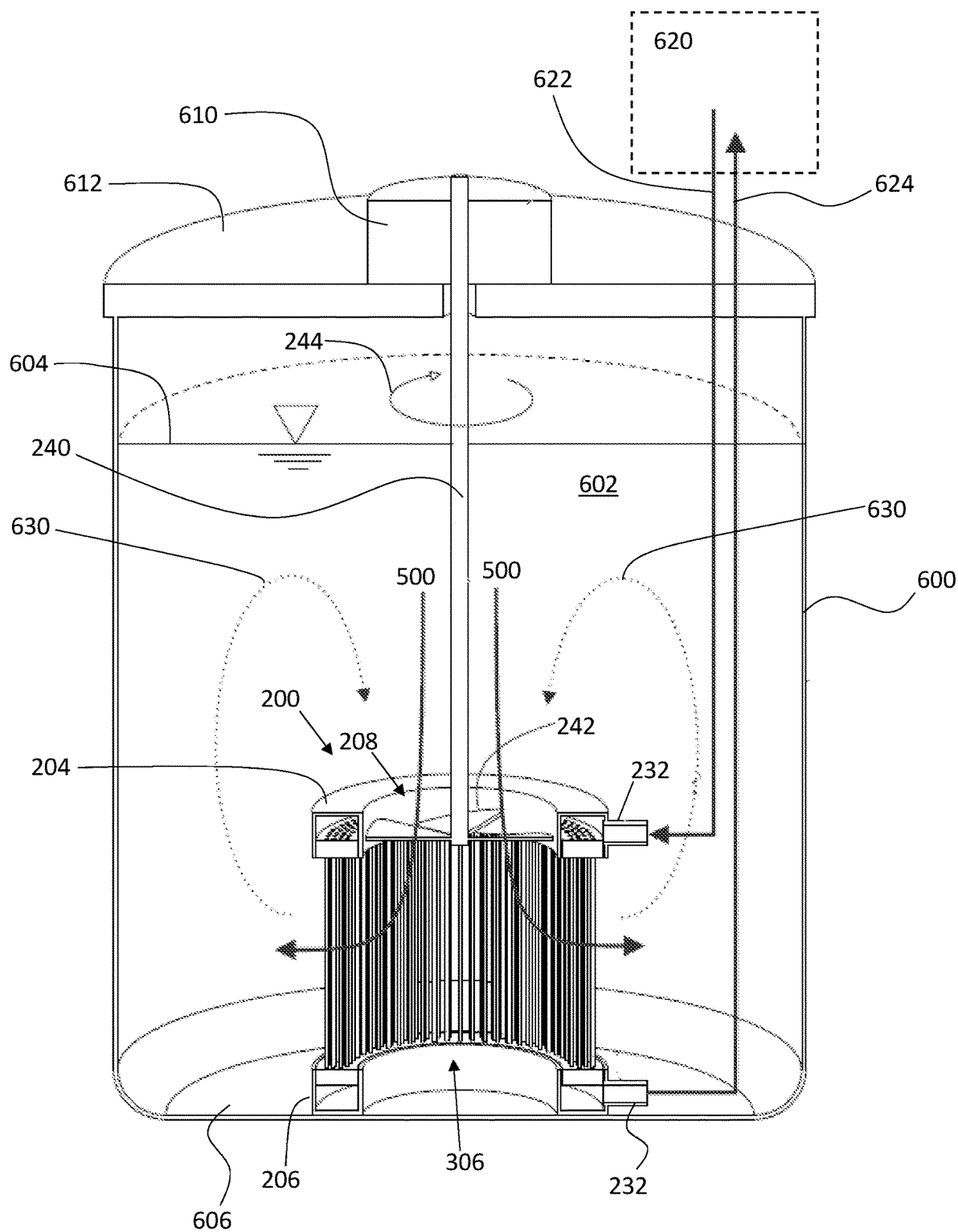
Figure 7:
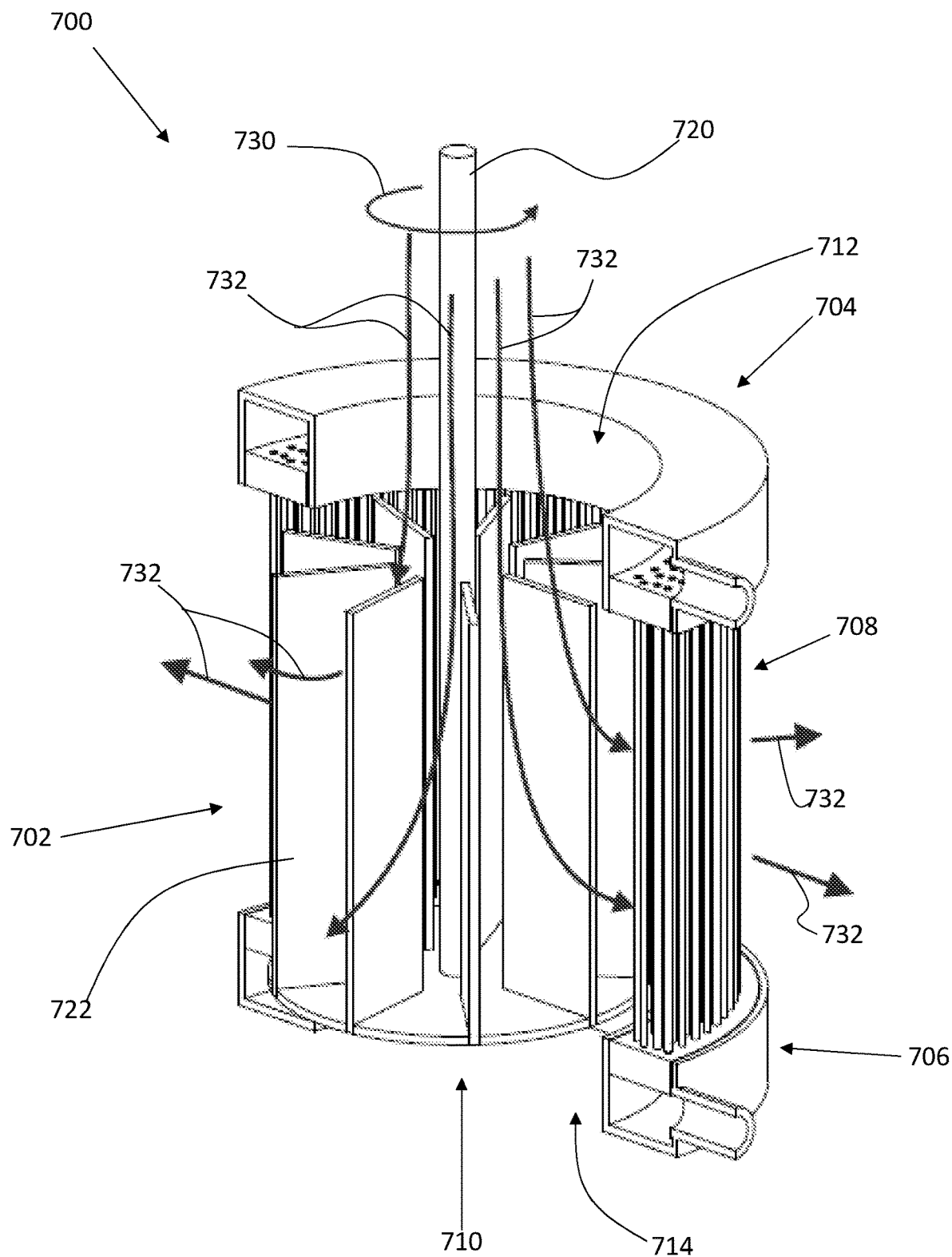
Figure 8:
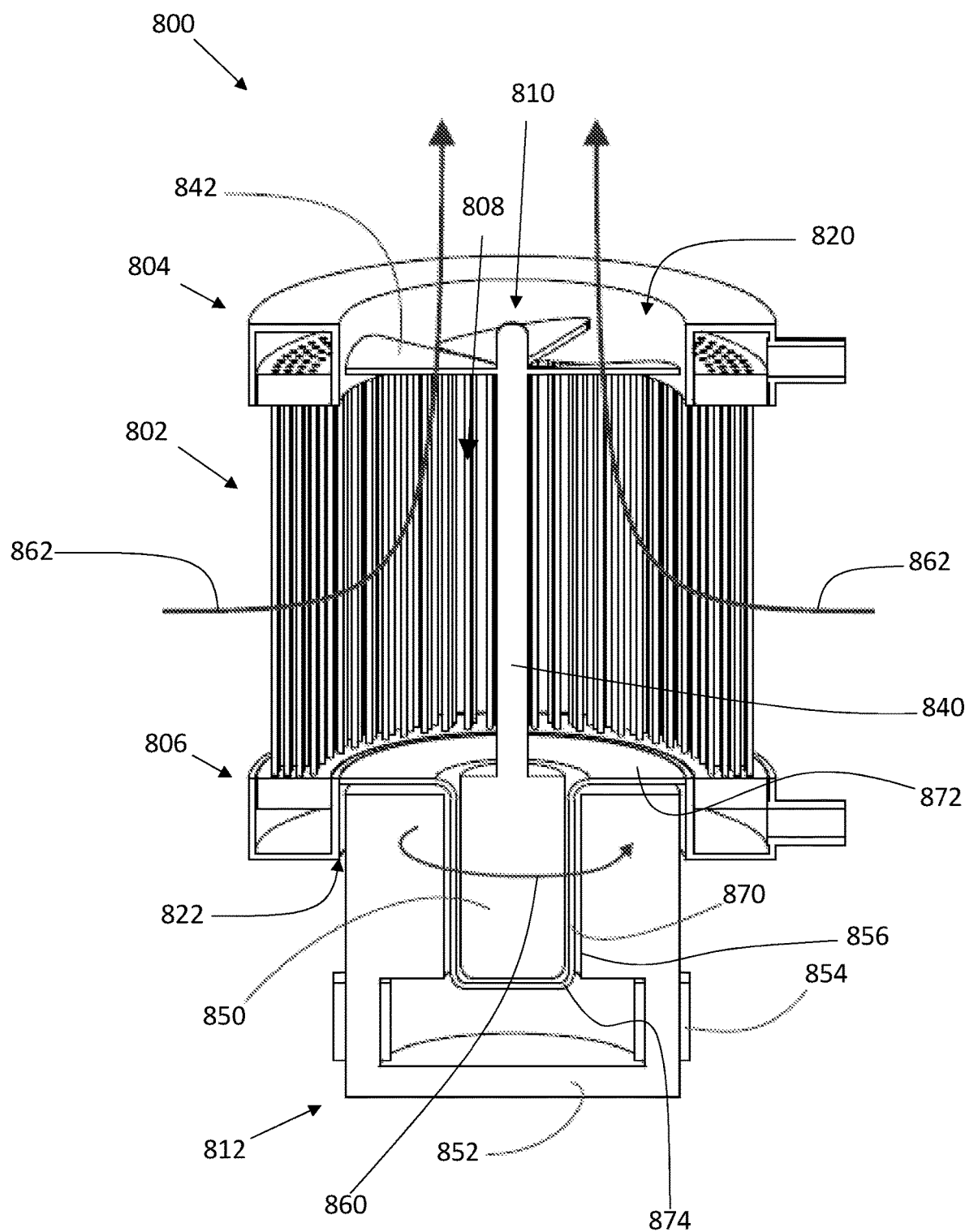
Figure 9:
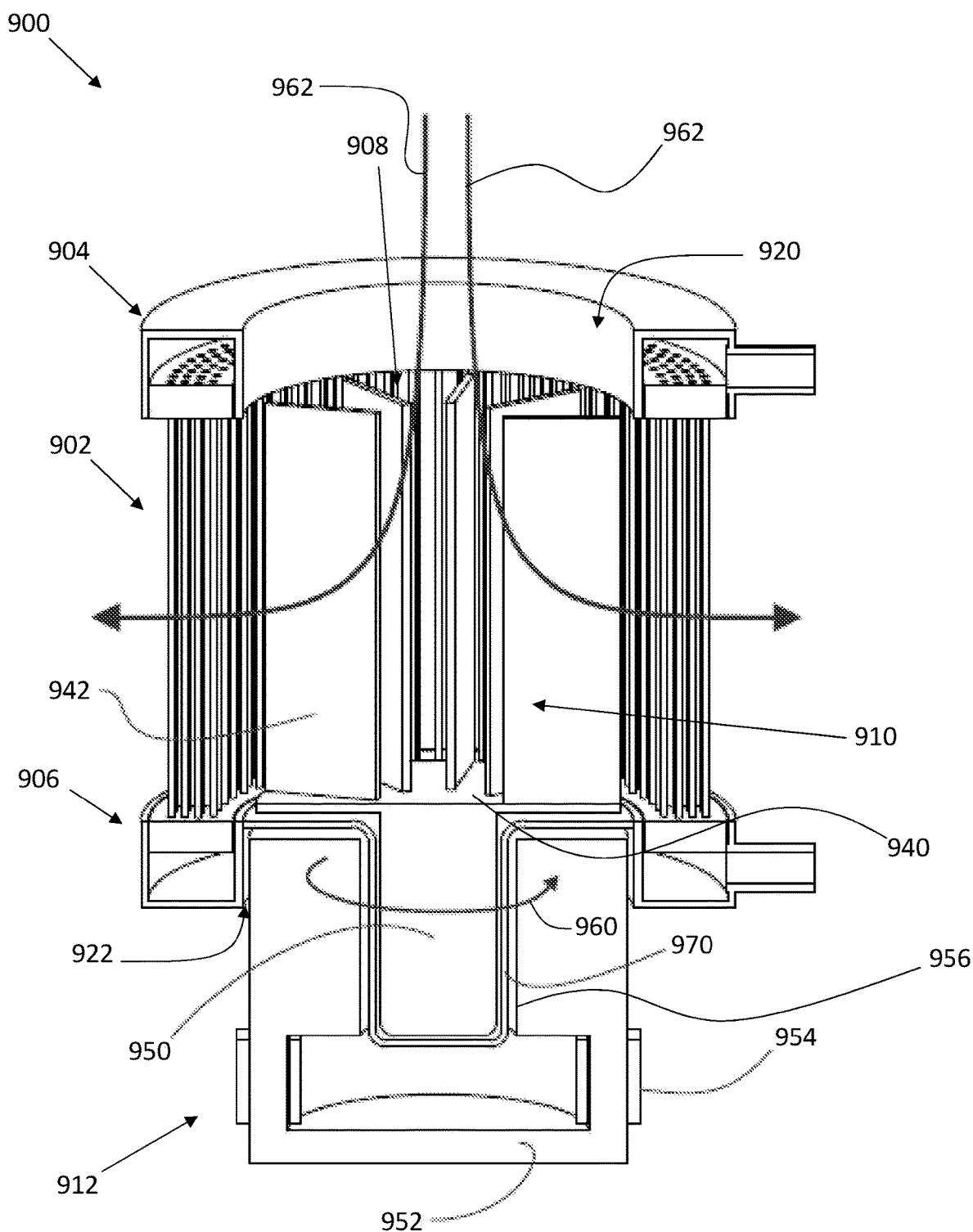
Figure 10:
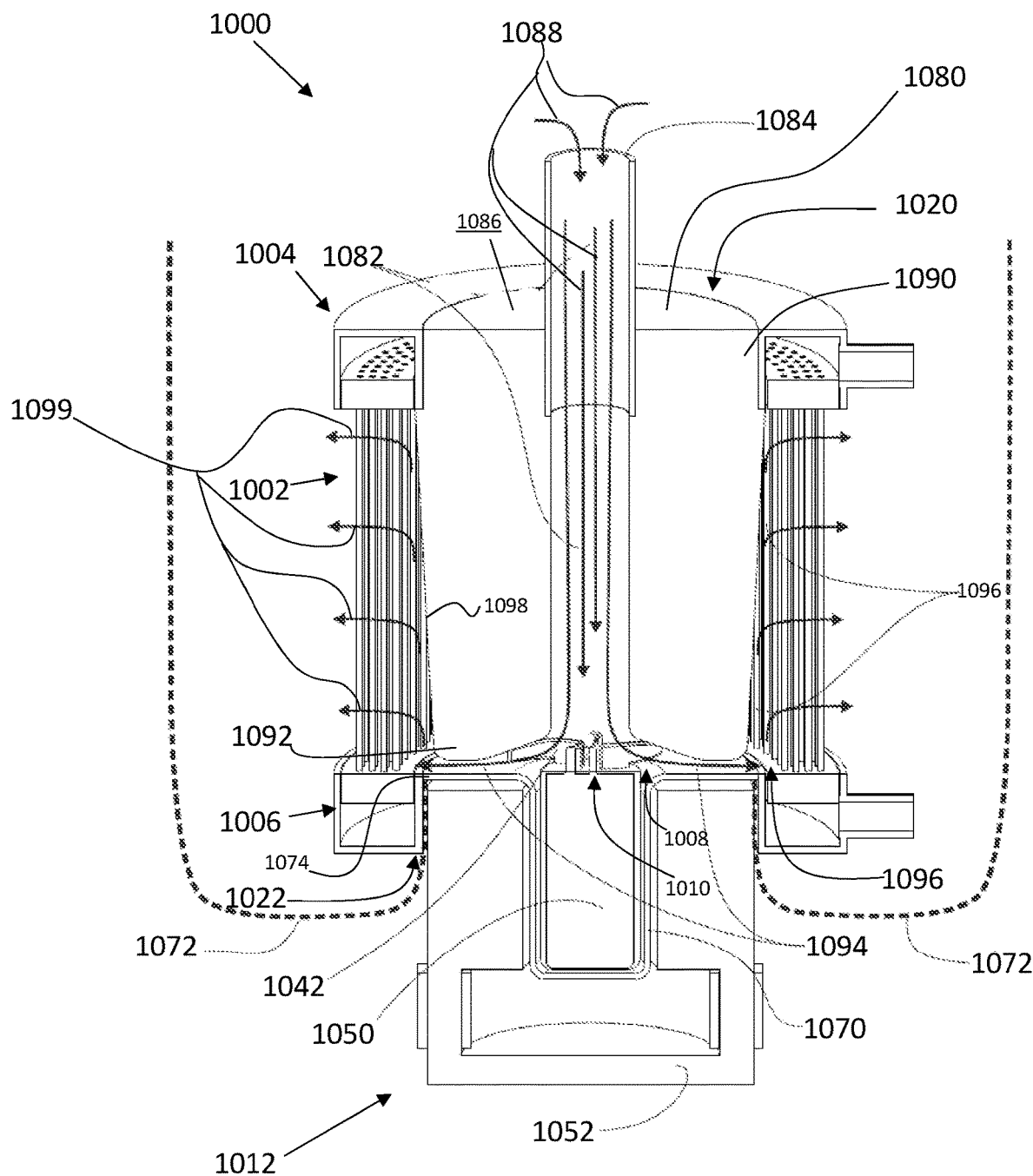
Figure 11A:
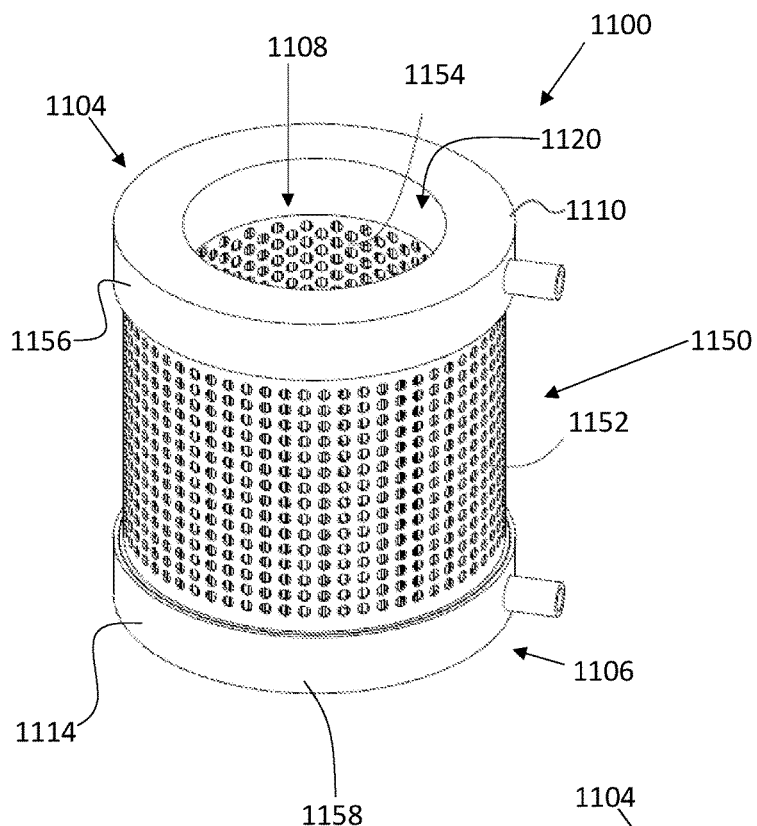
Figure 11B:
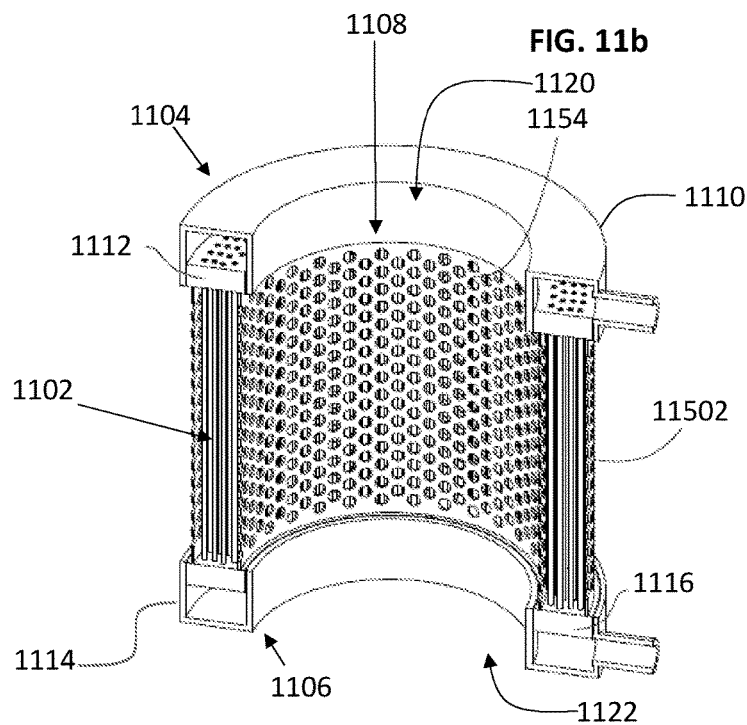

FIB. 3B is a cross-sectional top view of the plurality of hollow fibers along cross-section A-A in FIG. 3A;

FIG. 4A is a cross-sectional view of an annular bundle of hollow fibers utilizable with the membrane separator module of FIG. 2 and comprised of a first type of hollow fibers and a second type of hollow fibers, according to one or more embodiments shown and described herein;

FIG. 4B is a cross-sectional view of an annular bundle of hollow fibers utilizable with the membrane separator module of FIG. 2 and comprised of a first type of hollow fibers and a second type of hollow fibers, wherein a density of the second type of hollow fibers within the first type of fibers varies radially outward from a center of the annular bundle, according to one or more embodiments shown and described herein;

FIG. 4C is a cross-sectional view of an annular bundle of hollow fibers utilizable with the membrane separator module of FIG. 2, wherein a density of the hollow fibers varies radially outward from a center of the annular bundle, according to one or more embodiments shown and described herein;

FIG. 5 is a cross-sectional view of the membrane separator module of FIG. 2;

FIG. 6 is a cross-sectional side view of the membrane separator module of FIG. 2 utilized in a tank depicting example operation;

FIG. 7 is a cross-sectional side view of a membrane separator module having an alternately configured impeller, according to one or more embodiments shown and described herein;

FIG. 8 is a cross-sectional side view of a membrane separator module having an integrated drive unit for driving an axial flow impeller, according to one or more embodiments shown and described herein;

FIG. 9 is a cross-sectional side view of a membrane separator module having an integrated drive unit for driving a radial flow impeller, according to one or more embodiments shown and described herein;

FIG. 10 is a cross-sectional side view of a membrane separator module having integrated flow passageways and which is coupled to a tank liner, according to one or more embodiments shown and described herein;

FIG. 11A is an isometric view of a membrane separator module having a shroud, according to one or more embodiments shown and described herein; and FIG. 11B is a cross-sectional view of the membrane separator module of FIG. 11A.

DETAILED DESCRIPTION

The embodiments described herein provide a membrane separator module having a plurality of hollow fibers capable of driving fluid flow over the plurality of hollow fibers without utilization of a pump. The membrane separator module may be provided within a tank and at least partially submerged in the tank. In embodiments, the membrane separator module includes an impeller. In embodiments, the impeller is provided at an upper or lower opening of the membrane separator module for driving fluid flow through a bore of the membrane separator module that extends axially between the upper and lower openings. In other embodiments, the impeller is provided in the bore of the membrane separator module for driving fluid flow radially outward or inward relative to the bore. In embodiments, the impeller is driven via an external motor, whereas, in other embodiments, the impeller is driven via a magnetic drive assembly that is coupled to the membrane separator module.

FIG. 2 is an isometric view of a membrane separator module 200, according to one or more embodiments of the present disclosure. As illustrated, the membrane separator module 200 includes a plurality of hollow fibers 202, a first manifold 204, a second manifold 206, and an impeller 208.

FIGS. 3A and 3B illustrate the plurality of hollow fibers 202. In particular, FIG. 3A illustrates an isometric view of the plurality of hollow fibers 202 arranged as annular shaped bundle 300 having a first end 302 and a second end 304 opposite the first end 302. As shown in FIG. 3B, which is a cross-sectional view along line A-A in FIG. 3A, the annular shaped bundle 300 defines a bore 306, and each of the plurality of hollow fibers 202 defines a lumen 308. As shown in FIG. 3A, the bore 306 extends between the first end 302 and the second end 304, and each lumen 308 extends between the first end 302 and the second end 304.

Each of the plurality of hollow fibers 202 includes a sidewall 310 that functions as a semipermeable membrane that enables mass transfer across the membrane. Stated differently, the material of the sidewall 310 enables mass transfer through the sidewall 310, from the lumen 308 to an exterior surface 312 of the sidewall 310, or vice versa. For example, a gas mixture may flow through the lumens 308 of the plurality of hollow fibers 202, and a media fluid may flow over the exterior surface 312 of the sidewalls 310 thereof, and a gas specie partial pressure difference across the sidewall 310 would produce a membrane separation in which one or more gas species in the gas mixture transfer, from the lumen 308, across the sidewall 310, and into the media fluid that flows over the exterior surface 312 of the hollow fibers 202; and gases dissolved in the fluid media flowing over the exterior surface 312 of the hollow fibers 202 would transfer across the sidewall 310 (i.e., the membrane) into the gas mixture that is flowing within the lumen 308.

As shown in FIG. 3B, the plurality of hollow fibers 202 are preferentially uniformly distributed between the bore 306 and an outer periphery 314 of the annular shaped bundle 300. By this, it is meant that the annular shaped bundle 300 includes a plurality of discrete rows (or rings) that are concentric with each other, wherein the spacing between each of the hollow fibers 202 within a particular row (or ring) is uniform. The uniform spacing between the hollow fibers 202 in a particular row (or ring) may be the same or different than the spacing between the hollow fibers 202 in any one or more of the other rows (or rings). Moreover, the spacing (or gaps) between each of the hollow fibers 202 defines a plurality of radial fluid paths 320 through which a fluid (or gas) 322 may travel, whereby the fluid (or gas) 322 contacts the exterior surface 312 of the sidewall 310 when flowing along the radial fluid paths 320 such that the fluid (or gas) 322 is said to flow over the hollow fibers 202.

The plurality of hollow fibers 202 may be made from dense and porous semipermeable materials. In embodiments, the plurality of hollow fibers 202 are made from silicone. However, the plurality of hollow fibers 202 may be made from various other materials, such as a hydrophobic microporous membrane suitable for adding gases to the media fluid by flowing the gas mixture on one side of the sidewall 310 (e.g., within the lumen), and the media fluid on the other side of the sidewall 310 (e.g., corresponding with the exterior surface 312 of the sidewall 310).

Providing each of the plurality of hollow fibers 202 as hollow fibers, as shown, enables the packaging large amounts of the plurality of hollow fibers 202 in compact volumes of sidewall 310, and thereby maximizing the exposed surface area of the sidewalls 310. Moreover, each of the plurality of hollow fibers 202 is a self-supported, inherently stable membrane structure that can tolerate high pressure differences between the lumen 308 and the exterior surface 312 of the sidewall 310.

In embodiments, each of the plurality of hollow fibers 202 is of the same type. For example, each of the plurality of hollow fibers 202 may be made from the same type of material, as exemplified in FIGS. 3A and 3B. In other embodiments, however, the plurality of hollow fibers 202 comprises more than one type of hollow fiber. For example, as exemplified in FIGS. 4A and 4B, the plurality of hollow fibers 202 may include more than a single type of hollow fiber.

FIG. 4A illustrates an embodiment of a bundle 400 of hollow fibers 402 that includes a first type of hollow fibers 404 and a second type of hollow fibers 406, according to one or more embodiments of the present disclosure. As shown, the bundle 400 of hollow fibers 402 is arranged as an annulus (i.e., an annular shaped bundle), such that a bore 408 is provided within and extends through the hollow fibers 402. Here, the first type of hollow fibers 404 are arranged concentrically within the second type of hollow fibers 406. Here, the first type of hollow fibers 404 includes three (3) concentric rows (or rings), with an inner most concentric row (or ring) of the first type of hollow fibers 404 bordering the bore 408. Also, the second type of hollow fibers 406 includes three (3) concentric rows (or rings), and the second type of hollow fibers 406 are positioned radially outward from the first type of hollow fibers 404 such that an inner most concentric row (or ring) of the second type of hollow fibers 406 borders an outermost concentric row (or ring) of the first type of hollow fibers 404. However, either or both of the first type of hollow fibers 404 and the second type of hollow fibers 406 may include more or less than three (3) concentric rows (or rings). Also, in this embodiment, the first type of hollow fibers 404 and the second type of hollow fibers 406 are uniformly distributed within the bundle 400.

FIG. 4B illustrates another embodiment of a bundle 410 of hollow fibers 412 that includes a first type of hollow fibers 414 and a second type of hollow fibers 416, according to one or more other embodiments of the present disclosure. As shown, the bundle 410 of hollow fibers 412 is arranged as an annulus (i.e., an annular shaped bundle), such that a bore 418 is provided within and extends through the hollow fibers 412. Here, the hollow fibers 412 are arranged in a series of concentric rows (or rings), and a density of the second type of hollow fibers 416 organized within first type of hollow fibers 414 varies when evaluated in a radial direction as evaluated from the bore 418 to a periphery 420 of the bundle 410. In the illustrated example, the density of the second type of hollow fibers 416 organized within first type of hollow fibers 414 increases along the radial direction towards the periphery 420. Stated differently, the number of the second type of hollow fibers 416 in each of the concentric rows (or rings) increases towards the periphery 420, such that an outer most concentric row (or ring) proximate the periphery 420 would have a greater number of the second type of hollow fibers 416 than another concentric row (or ring) that is further from the periphery 420 or positioned radially inward from the outer most concentric row (or ring). In the illustrated embodiment, the outer most concentric row (or ring) includes only the second type of hollow fibers 416, but in other embodiments, at least some of the first type of hollow fibers 414 may be provided in the outer most concentric row (or ring). Also, in the illustrated embodiment, the inner most concentric row (or ring) includes both the first type of hollow fibers 414 and the first type of hollow fibers 416, but in other embodiments, the inner most concentric row (or ring) may include only the first type of hollow fibers 414.

FIG. 4C an embodiment of an annular shaped bundle 430 of hollow fibers 432 arranged such that the density of the hollow fibers 432 varies, according to one or more embodiments. As shown, the annular shaped bundle 430 of hollow fibers 432 is arranged as an annulus, such that a bore 434 is provided within and extends through the annular bundle 430. Here, the annular bundle 430 comprises an inner most row (or ring) of fibers 436 that borders the bore 434, an outer most row (or ring) of fibers 438 that borders a periphery 440 of the annular bundle 430, and several intermediate rows (or rings) concentrically arranged between the inner most row (or ring) of fibers 436 and the outer most row (or ring) of fibers 438. As shown, the spacing between the hollow fibers 432 in inner most row (or ring) of fibers 436 is greatest and the spacing between the hollow fibers 432 in outer most row (or ring) of fibers 438 is the smallest, with the spacing between the hollow fibers 432 of each of the several intermediate rows (or rings) decreasing towards the outer most row (or ring) of fibers 438. Thus, in the illustrated embodiment, a density of the plurality of hollow fibers 432 increases along a radial direction, from the bore 434 toward the periphery 440.

Regardless of the organization of the plurality of hollow fibers 202 and/or whether the plurality of hollow fibers 202 are of the same or more than one type, arranging them together as an annular bundle (e.g., the annular shaped bundle 300, 400, 410, 430, etc.) promotes uniform flow of the fluid (or gas) 322 over the exterior surfaces 312 of the plurality of hollow fibers 202. Such uniform flow is desirable to optimize performance of the plurality of hollow fibers 202, which are gas permeable hollow fibers. For example, if the fluid flow on the exterior surfaces 312 of the plurality of hollow fibers 202 is not uniform, then the fluid transfer across the plurality of hollow fibers 202 will not be uniform and certain areas of the plurality of hollow fibers 202 may achieve more permeate flow across it than others. Moreover, shunting flow outside of the plurality of hollow fibers 202 may occur where the plurality of hollow fibers 202 are not organized as an annulus, where fluid flowing outside the plurality of hollow fibers 202 would preferentially flow in the most direct path or unintended path while substantially bypassing areas of the plurality of hollow fibers 202 outside this path.

Referring again to FIG. 2, the first manifold 204 is disposed on the first end 302 of the annular shaped bundle 300 and the second manifold 206 is disposed on the second end 304 of the annular shaped bundle 300. As previously mentioned, the geometry of the plurality of hollow fibers 202 provides them with sufficient inherent strength such that they may support the first manifold 204 and/or the second manifold 206 in the illustrated orientation without collapsing. Thus, while the first manifold 204 may support the plurality of hollow fibers 202 at the first end 302 of the annular shaped bundle 300 and the second manifold 206 may support the plurality of hollow fibers 202 at the second end 304 of the annular shaped bundle 300, the inherent strength of the plurality of hollow fibers 202 when bundled together may allow them to support the first manifold 204 relative to the second manifold 206 in a spaced relationship, and vice versa.

The first manifold 204 includes a first cover 210 and a first plate 212 (see FIG. 5). Similarly, the second manifold 206 includes a second cover 214 and a second plate 216. The first plate 212 and the second plate 216 each have a plurality of openings, with the openings of the first plate 212 each receiving a respective one of the plurality of hollow fibers 202 at the first end 302 thereof, and with the openings of the second plate 216 each receiving a respective one of the plurality of hollow fibers 202 at the second end 304 thereof. In particular, the first end 302 of each of the plurality of hollow fibers 202 is sealed in a respective one of the openings of the first plate 212 and the second end 304 of each of the plurality of hollow fibers 202 is sealed in a respective one of the openings of the second plate 216. In embodiments, the first plate 212 and the second plate 216 are made from a potting material and formed as sheets within which the respective ends of the plurality of hollow fibers 202 are potted or sealed. The potting material is the material that forms the first plate 212 and the second plate 216, which each seals the plurality of hollow fibers 202 in the membrane separator module 200. The first plate 212 and the second plate 216 are each formed by "potting" the plurality of hollow fibers 202 (like plants) in the potting material. Potting materials are typically liquid during the potting process, and then harden to form the article to be formed therefrom (i.e., the first plate 212 and the second plate 216). Potting materials may include two-part cross-linkable compounds, such as polyurethane, epoxy, and silicone, etc.; and may also include polymers, such as polypropylene and polyethylene, which are applied in a molten liquid state, and then allowed to become solid.

In the illustrated embodiment, the first manifold 204 and the second manifold 206 are each annular shaped and having an opening, with the first manifold 204 defining a first opening 220 and the second manifold 206 defining a second opening 222 (see FIG. 5). The first opening 220 and the second opening 222 correspond with the first end 302 and the second end 304, respectively, of the bore 306 and each open into (and extend into) opposite openings of the bore 306. Thus, the first opening 220 of the first manifold 204 is in communication with the bore 306 at the first end 302 and the second opening 222 of the second manifold 206 is in communication with the bore 306 at the second end 304.

A fluid inlet port 230 is provided on the first manifold 204 and a fluid outlet port 232 is provided on the second manifold 206. In particular, the fluid inlet port 230 is disposed on the first cover 210 of the first manifold 204 and the fluid outlet port 232 is disposed on the second cover 214 of the second manifold 206.

The impeller 208 includes a shaft 240 and a plurality of vanes 242 provided on the shaft 240. A motor (not shown) may be operatively coupled to the shaft 240 of the impeller 208 to thereby cause rotation of the impeller 208, for example, as indicated by arrow 244. The shaft 240 may be a flexible shaft, thereby allowing the motor to be remotely positioned relative to the membrane separator module 200. For example, the shaft 240 may include a core and a sleeve, or may be another type of flexible shaft.

As hereinafter described, the impeller 208 may be least partially arranged in the bore 306 of the annular shaped bundle 300 and/or in either or both of the first opening 220 of the first manifold 204 and the second opening 222 of the second manifold 206. In the illustrated embodiment, the vanes 242 are arranged in the first opening 220 of the first manifold 204.

FIG. 5 is a cross-sectional view of the membrane separator module 200 of FIG. 2 depicting example operation thereof. As shown, the impeller 208 is operable to drive fluid flow exterior the plurality of hollow fibers, such that the fluid flow flows over the exterior surface 312 of the plurality of hollow fibers 202, and the fluid flow may be the fluid (which may be liquid, gas, or a mixture of both) 322 described above with reference to FIGS. 3A and 3B. In the illustrated embodiment, the vanes 242 are arranged to drive fluid flow into the bore 306, through the first opening 220, and radially outward over the sidewalls 310 the plurality the hollow fibers 202 as indicated by arrow 500. Here, the rotation of the vanes 242 pulls the fluid 322 from above the first manifold 204, and sucks the fluid 322 through the first opening 220 and into the bore 306, at which it may flow radially outward from the bore 306, over the exterior surfaces 312 of the plurality of hollow fibers 202 as indicated by the arrow 500. While not illustrated, the fluid 322 may also flow out of the bore 306 through the second opening 222 in the second manifold 206. Thus, the impeller 208 of the illustrated embodiment drives fluid flow into a central area of the bore 306, between the first manifold 204 and the second manifold 206, and then radially outward through the plurality of hollow fibers 202 and over the exterior surfaces 312 thereof, where, for example, the fluid flow may thereafter mix and recirculate with fluid in a tank within which the membrane separator module 200 is provided, as illustrated by the arrow 500.

In the illustrated embodiment, the first manifold 204 defines a first interior volume 504 that is in fluid communication with the lumens 308 of the plurality of hollow fibers 202 and the second manifold 206 defines a second interior volume 506 that is in fluid communication with the lumens 308 of the plurality of hollow fibers 202. In particular, the first interior volume 504 is defined between an interior space formed within the first cover 210 and a surface of the first plate 212 when the first plate 212 is sealed within the interior space of the first cover 210. Similarly, the second interior volume 506 is defined between an interior space formed within the second cover 214 and a surface of the second plate 216 when the second plate 216 is sealed within the interior space of the second cover 214. Also, the fluid inlet port 230 defines an inlet channel 530 that is in fluid communication with the first interior volume 504 of the first manifold 204, and the fluid outlet port 232 defines an outlet channel 532 that in fluid communication with the second interior volume 506 of the second manifold 206. Accordingly, a fluid path is defined through the inlet channel 530 of the fluid inlet port 230, the first interior volume 504 of the first manifold 204, the lumens 308 of the plurality of hollow fibers 202, the second interior volume 506 of the second manifold 206, and the outlet channel 532 of the fluid outlet port 232. As hereinafter described, a second fluid may be directed (flow) through the fluid path, while the impeller 208 drives the first fluid 322 over the exterior surfaces 312 of the plurality of hollow fibers 202 to achieve membrane separation.

The fluid path may be differently defined in other types of separation processes, however. For example, the outlet channel 532 of the fluid outlet port 232 may be plugged or sealed closed, thereby inhibiting flow there-through; or the lumens 308 of the plurality of hollow fibers 202 may be plugged or sealed closed at the second plate 216, thereby inhibiting flow there-through. In examples where the fluid outlet port 232 is plugged, that fluid path would not be defined through the outlet channel 532 of the fluid outlet port 232, which is plugged or sealed closed, but fluid could still flow into the second interior volume 506 of the second manifold 206; and, in embodiments where the plurality of hollow fibers 202 are plugged or sealed closed proximate to the second plate 216 (e.g., at the second ends 304), the fluid path would not extend into the second interior volume 506 of the second manifold 206 at all, and in some of these latter examples, the second manifold 206 may not be included from the module. These types of fluid paths may be utilized in various types of separation processes, such as such as dead end gassing and vacuum degassing.

FIG. 6 illustrates utilization of the membrane separator module 200 utilized in a tank 600, according to one or more embodiments. The depicted tank 600 is just one example tank that can suitably incorporate the principles of the present disclosure. Indeed, many alternative designs and configurations of the tank 600 may be employed, without departing from the scope of this disclosure.

In the illustrated embodiment, the tank 600 contains a fluid media 602. In embodiments, fluid media 602 may be a liquid-phase material or a gas-phase material. Thus, the fluid media 602 may include various types of solutions, such as cell culture media, fermentation broth, waste water, mixtures of gases and vapors such as volatile organic compound ("VOC").

In the illustrated embodiment, the membrane separator module 200 is positioned within the tank 600 such that it is beneath a surface 604 of the fluid media 602. For example, the membrane separator module 200 is positioned beneath the surface 604 of the fluid media 602 such that the first manifold 204 (and the second manifold 206) are both beneath the surface 604 of the fluid media 602. However, in other examples, the second manifold 206 may be located beneath the surface 604 of the fluid media 602 and the first manifold 204 may be positioned above the surface 604 of the fluid media 602, such that the surface 604 of the fluid media 602 corresponds with some point (or slice) of the annular shaped bundle 300 of the plurality of hollow fibers 202.

Also, in the illustrated embodiment, the membrane separator module 200 is positioned on a bottom surface 606 of the tank 600. Here, the second manifold 206 is positioned on a bottom surface 606 of the tank 600, such that the bottom surface 606 blocks (covers) the second opening 222 of the second manifold 206. In this manner, that the fluid media 602 is not able to flow into (or out of) the bore 306 via the second opening 222. Thus, fluid flow entering the bore 306 through the first opening 220 will be directed radially outward through the spaces between the of the plurality of hollow fibers 202, as shown by the arrow 500 in FIG. 5. However, in other embodiments, the membrane separator module 200 is positioned in the tank 600 such that the first manifold 204 is provided on the bottom surface 606 to thereby block (cover) the first opening 220 thereof, while leaving the second opening 222 of the second manifold 206 open (uncovered or unblocked). In other embodiments, the first opening 220 of the first manifold 204 or the second opening 222 of the second manifold 206 may be sealed or blocked off by another structure (i.e., not the bottom surface 606 of the tank 600), and this will enable the membrane separator module 200 to be suspended above the bottom surface 606 of the tank 600 while still having only one of the openings functioning.

In even other embodiments, the membrane separator module 200 may be positioned within the tank 600 such that both the first opening 220 and the second opening 222 are open (uncovered or unblocked) and operable to allow fluid flow there-through. For example, the membrane separator module 200 may be suspended within the tank 600 such that both the first manifold 204 and the second manifold 206 are spaced from the bottom surface 606 of the tank 600, thereby ensuring that both the first opening 220 and the second opening 222 are both open or uncovered to allow fluid flow there-through. In such examples, a second impeller may be provided in the second opening 222, with such second impeller arranged opposite the impeller 208 (i.e., the second impeller being arranged to pull/draw fluid flow, from exterior the bore 306, into the bore 306 through the second opening 222), such that the fluid flow is pulled into the bore 306 through both the first opening 220 of the first manifold 204 and the second opening 222 of the second manifold 206, and then directed radially outward from the bore 306 through the plurality of hollow fibers 202.

In the illustrated embodiment, the impeller 208 is driven by a motor 610. As shown, the motor 610 is coupled to the shaft 240. Here, the motor 610 is provided on a lid 612 of the tank 600. However, the motor 610 may be provided elsewhere, nearer or further from the membrane separator module 200, and the shaft 240 may be a flexible shaft to thereby facilitate positioning of the motor 610 relative to the membrane separator module 200.

A fluid supply 620 is provided for supplying a second fluid through the fluid path defined inside the membrane separator module 200, wherein, as previously described, the fluid path is defined through the inlet channel 530 of the fluid inlet port 230, the first interior volume 504 of the first manifold 204, the lumens 308 of the plurality of hollow fibers 202, the second interior volume 506 of the second manifold 206, and the outlet channel 532 of the fluid outlet port 232. As shown, a first conduit 622 extending from the fluid supply 620 is connected to the fluid inlet port 230, and a second conduit 624 extending from the fluid supply 620 is connected to the fluid inlet port 230. Thus, the second fluid may be supplied from the fluid supply 620 and into the fluid inlet port 230 via the first conduit 622, flow through the lumens 308 of the plurality of hollow fibers 202 such that a membrane separation may occur with the first fluid (i.e., the fluid media 602) within the tank 600, and then exit the membrane separator module 200 (possibly with other fluids including gases resulting from the separation) through the fluid outlet port 232 and through the second conduit 624.

As previously mentioned, rotation of the impeller 208 causes the fluid media 602 to be pulled through the opening 220 in the first manifold 204 and into the bore 306 where it will be directed radially outward from the bore 306 as shown by the arrows 500. When the membrane separator module 200 is positioned within the tank 600 as shown, this pattern of fluid flow caused by the impeller 208 further induces recirculation of the fluid media 602 within the tank 600, as shown by arrow 630. While the illustrated example depicts fluid flow as shown by the arrow 500, the impeller 208 may be differently configured to reverse fluid flow (e.g., by reversing direction of rotation of the impeller 208 or changing configuration of the vanes 242 thereof), such that the fluid media 602 flows radially inward through the plurality of hollow fibers 202 and upward through the first opening 220 of the first manifold 204.

FIG. 7 illustrates a membrane separator module 700 having an alternately configured impeller 702, according to one or more embodiments shown and described herein. In the illustrated embodiment, the membrane separator module 700 is similar to the membrane separator module 200 described above and, therefore, includes a first manifold 704, a second manifold 706, and a plurality of hollow fibers 708 extending between the first manifold 704 and the second manifold 706, wherein the plurality of hollow fibers 708 are bundled as an annulus (i.e., the plurality of hollow fibers 708 are organized as an annular shaped bundle) and define a bore 710 of the membrane separator module 700 that extends between a first opening 712 in the first manifold 704 and a second opening 714 in the second manifold 706.

As with the impeller 208 described above, the impeller 702 impeller includes a shaft 720 and a plurality of vanes 722 provided on the shaft 720. However, in the illustrated embodiment, the plurality of vanes 722 are arranged in the bore 710. The impeller 702 is rotatable, for example, as indicated by arrow 730. Here, the plurality of vanes 722 are arranged to, upon rotation of the impeller 702, drive fluid flow radially outward through (gaps between) the plurality of hollow fibers 708 from the bore 710, as shown by arrows 732, which may also induce fluid flow into the bore 710 from exterior the membrane separator module 700 through the first opening 712 (and/or which may also induce fluid flow into the bore 710 from exterior the membrane separator module 700 through the second opening 714, depending on whether either of the first opening 712 or the second opening 714 is sealed/closed as described above). In this manner, the fluid flows over exterior surfaces of the plurality of hollow fibers 708. Also, rotation of the impeller 702 may be reversed such that the impeller pulls fluid from exterior the membrane separator module 700 into the bore 710 over exterior surfaces of the plurality of hollow fibers 708.

Accordingly, the plurality of vanes 722 of the impeller 702 arranged within the bore 710 are configured as a radial flow impeller, whereas the plurality of vanes 242 of the impeller 208 arranged in the first opening 220 are configured as an axial flow impeller.

However, the impeller 208 of FIGS. 2 and 5-6 and the impeller of FIG. 7 are just two example embodiments of impellers, and other types or configurations of impellers may be utilized to drive fluid flow over the exterior surfaces 312 of the plurality of hollow fibers 202. These types include but are not limited to axial flow, radial flow, centrifugal flow, mixed flow, propellers, paddles, turbines, blower wheels, fans, and combinations thereof. The type of impeller used may depend on the fluid being driven by it (e.g., gas or liquid), the location at which the impeller will be provided (e.g., such as at the opening of a manifold (as shown in FIG. 5), or somewhere inside the bore of annular space (as shown in FIG. 7)).

In some embodiments, the impeller is configured for both axial flow and radial flow. In these embodiments, the plurality of vanes may be positioned within the bore as well as in either or both openings in the manifolds. For example, the impeller may include a set of radial flow impellers located in the bore and a set or axial flow vanes in the opening in the first manifold (and/or a set or axial flow vanes in the opening in the second manifold). These separate sets of vanes may be separate components that are each separately attached to the impeller shaft, or each vane may be contoured such that it has a axial flow portion located within the bore and, at either or both ends, a portion located within the manifold opening and configured for axial flow.

As described above, a motor may be utilized to drive the impeller, and such motor may be located at various locations relative to the membrane separator module. In some embodiments, however, the impeller may be driven by a drive unit that is integrated within the membrane separator module.

FIG. 8 illustrates a membrane separator module 800 having an impeller 810 and an integrated drive unit 812, according to one or more embodiments shown and described herein. In the illustrated embodiment, the membrane separator module 800 is similar to the membrane separator module 200 described above and, therefore, includes a first manifold 804, a second manifold 806, and a plurality of hollow fibers 802 extending between the first manifold 804 and the second manifold 806, wherein the plurality of hollow fibers 802 are bundled as an annulus (i.e., the plurality of hollow fibers 802 are organized as an annular shaped bundle) and define a bore 808 of the membrane separator module 800 that extends between a first opening 820 in the first manifold 804 and a second opening 822 in the second manifold 806. As with the impeller 208 described above, the impeller 810 includes a plurality of vanes 842 arranged within the first opening 820 as an axial flow impeller. The impeller 810 also includes a shaft 840 on which the plurality of vanes 842 are supported.

In the illustrated embodiment, the integrated drive unit 812 includes a rotor magnet 850 and a magnetic stator 852. The magnetic stator 852 is at least partially provided in the second opening 822 of the second manifold 806, opposite the plurality of vanes 842 of the impeller 810 which are arranged within the first opening 820 of the first manifold 804. The magnetic stator 852 includes a plurality of windings 854 through which current may be provided to create a magnetic field. Also, the magnetic stator 852 includes a recess 856 that is oriented such that it extends from the bore 808 and into the magnetic stator 852 through the second opening 822. As shown, the rotor magnet 850 is provided on a bottom end of the shaft 840 (opposite the plurality of vanes 842), and the shaft 840 is oriented such that it extends from the plurality of vanes 842 in the first opening 820, through the bore 808, and into the recess 856 of the magnetic stator 852. Thus, the magnetic stator 852 is positioned proximate to the second manifold 806, and the magnetic stator 852 surrounds the rotor magnet 850. When electric current is introduced to the windings 854, a magnetic field is induced that causes rotation of the rotor magnet 850 relative to the magnetic stator 852, as indicated by arrow 860, and such rotation of the rotor magnet 850 thereby rotates the shaft 840 and the plurality of vanes 842 supported thereon to thereby drive fluid over the exterior surfaces of the plurality of hollow fibers 802. In the illustrated embodiment, the plurality of vanes 842 are arranged such that they drive fluid, from the bore 808, out of the membrane separator module 800 through the first opening 820 in the first manifold 804, which also induces the fluid to flow radially inward (from exterior the membrane separator module 800) into the bore 808 over the exterior surfaces of the plurality of hollow fibers 802, as indicated by arrows 862. However, the plurality of vanes 842 may instead be arranged as described with reference to FIG. 5, such that they pull fluid, from exterior the membrane separator module 800, into the bore 808 via the first opening 820 in the first manifold 804 and then radially outward of the bore 808 over the plurality of hollow fibers 802. Also, while the illustrated embodiment depicts the magnetic stator 852 of the integrated drive unit 812 positioned proximate to second manifold 806 and the impeller 810 positioned within the first manifold 804, this configuration can be reversed, with the magnetic stator 852 being provided in the first opening 820 of the first manifold 804, opposite the plurality of vanes 842 of the impeller 810 which would be provided within the second opening 822 of the second manifold 806.

In the illustrated embodiment, the membrane separator module 800 includes a cover 870 provided between the magnetic stator 852 and the rotor magnet 850. Regardless of whether the cover 870 is integrally formed with the second manifold 806, it covers or blocks the second opening 822 associated with the second manifold 806 such that fluid is inhibited from flowing through the second opening 822 of the second manifold 806. In some embodiments, the cover 870 is a separate component that is sealed within the second opening 822, whereas, in other embodiments, the cover 870 is integral with the second manifold 806. In embodiments where the magnetic stator 852 is provided proximate to the first manifold 804, the cover 870 may similarly be provided to cover or block the first opening 820 associated with the first manifold 804. As shown, the cover 870 includes a rim 872 that is sealed within second opening 822 and a cylindrical extension portion 824 that extends from a center of the rim 872 through the second opening 822 and into the recess 856 of the magnetic stator 852 so as to form a barrier between the magnetic stator 852 and the rotor magnet 850 and to operate as a containment shell for containing the fluid media within the bore 808 of the membrane separator module 800.

FIG. 9 illustrates another example membrane separator module 900 having an impeller 910 and an integrated drive unit 912, according to one or more embodiments shown and described herein. In the illustrated embodiment, the membrane separator module 900 is similar to the membrane separator module 700 described above and, therefore, includes a first manifold 904, a second manifold 906, and a plurality of hollow fibers 902 extending between the first manifold 904 and the second manifold 906, wherein the plurality of hollow fibers 902 are bundled as an annulus (i.e., the plurality of hollow fibers 902 are organized as an annular shaped bundle) and define a bore 908 of the membrane separator module 900 that extends between a first opening 920 in the first manifold 904 and a second opening 922 in the second manifold 906. As with the impeller 702 described above, the impeller 910 includes a plurality of vanes 942 arranged within the bore 908 as a radial flow impeller. The impeller 910 also includes a base plate 940 on which the plurality of vanes 942 are supported.

In the illustrated embodiment, the integrated drive unit 912 includes a rotor magnet 950 and a magnetic stator 952. The magnetic stator 952 is at least partially provided in the second opening 922 of the second manifold 906. The magnetic stator 952 includes a plurality of windings 954 through which current may be provided to create a magnetic field. Also, the magnetic stator 952 includes a recess 956 that is oriented such that it extends from the bore 908 and into the magnetic stator 952 through the second opening 922. As shown, the rotor magnet 950 is provided on a bottom side of the base plate 940 (opposite a side of the base plate 940 on which the plurality of vanes 942 are mounted), and the rotor magnet 950 is oriented such that it extends from the base plate 940 and into the recess 956 of the magnetic stator 952. Thus, the magnetic stator 952 is positioned proximate to the second manifold 906, and the magnetic stator 952 surrounds the rotor magnet 950. When electric current is introduced to the windings 954, a magnetic field is induced that causes rotation of the rotor magnet 950 relative to the magnetic stator 952, as indicated by arrow 960, and such rotation of the rotor magnet 950 thereby rotates the base plate 940 and the plurality of vanes 942 supported thereon to thereby drive fluid over the exterior surfaces of the plurality of hollow fibers 902. In the illustrated embodiment, the plurality of vanes 942 are arranged such that they drive fluid, from the bore 908, radially outward from the bore 908 of the membrane separator module 900, through the gaps or openings between the plurality of hollow fibers 902 (and over exterior surfaces of the plurality of hollow fibers 902), which also induces the fluid to axially inward (from exterior the membrane separator module 900) into the bore 908 through the first opening 920 in the first manifold 904, as indicated by arrows 962.

Also in the illustrated embodiment, the membrane separator module 900 includes a cover 970 provided between the magnetic stator 952 and the rotor magnet 950. Where utilized, the cover 970 may be provided similar to the cover 870 described above.

FIG. 10 illustrates an embodiment of a membrane separator module 1000 configured to uniformly distribute the fluid flow from an impeller 1010 to a bundle a plurality of hollow fibers 1002, according to one or more embodiments shown and described herein.

In the illustrated embodiment, the membrane separator module 1000 is similar to the membrane separator module 900 described above and, therefore, includes a first manifold 1004 and a second manifold 1006, with the plurality of hollow fibers 1002 extending between the first manifold 1004 and the second manifold 1006, wherein the plurality of hollow fibers 1002 are bundled as an annulus (i.e., the plurality of hollow fibers 1002 are organized as an annular shaped bundle) and define a bore 1008 of the membrane separator module 1000 that extends between a first opening 1020 in the first manifold 1004 and a second opening 1022 in the second manifold 1006. As with the impeller 910 described above, the impeller 1010 includes a plurality of vanes 1042 arranged as a radial flow impeller within the bore 908, proximate to the second opening 1022.

The membrane separator module 1000 includes a drive unit 1012. The drive unit 1012 is similar to the drive unit 912 described above and thus includes a rotor magnet 1050 and a magnetic stator 1052. Also in the illustrated embodiment, the membrane separator module 1000 includes a cover 1070 provided between the magnetic stator 1052 and the rotor magnet 1050, and the cover 1070 may be provided as described above.

In the illustrated embodiment, the membrane separator module 1000 includes a baffle structure 1080 that defines an interior flow channel 1082. Here, the baffle structure 1080 is provided (sealed) within the first opening 1020 of the first manifold 1004. In this manner, flow is inhibited from flowing through the first opening 1020 of the first manifold 1004 except through the interior flow channel 1082 of the baffle structure 1080. In the illustrated embodiment, an inlet conduit 1084 is provided in communication with the interior flow channel 1082 of the baffle structure 1080 and extends upward from an upper surface 1086, such that flow (indicated by the arrow 1088) may be pulled from a location spaced above the membrane separator module 1000 and into the interior flow channel 1082 of the baffle structure 1080. In examples, the baffle structure 1080 is a cylindrically shaped member or a frustoconically shaped member.

As mentioned, an upper end 1090 of the baffle structure 1080 is secured within the first opening 1020 of the first manifold 1004. The baffle structure 1080 extends downward from the first manifold 1004 towards the second manifold 1006 and terminates at a second end 1092 that is spaced from (above) the upper surface of the cover 1070, such that a radial passageway 1094 is defined between the second end 1092 of the baffle structure 1080 and the upper surface of the cover 1070, wherein the radial passageway 1094 is in fluid communication with the interior flow channel 1082. Also, a distribution passageway 1096 is defined between a peripheral surface 1098 of the baffle structure 1080 and an interior side of the plurality of hollow fibers 1002 which define the bore 1008, wherein the distribution passageway 1096 has an annular shape when evaluated in cross-section. In the illustrated example, the baffle structure 1080 is slightly frusoconical in shape, such that its diameter decreases from the first manifold 1004 towards the 1006, and such tapering of the peripheral surface 1098 provides the distribution passageway 1096 with a corresponding tapered geometry that decreases towards the first manifold 1004. Thus, in the illustrated embodiment, the distribution passageway 1096 has an annulus shaped passageway with a ring thickness that decreases from the second manifold 1006 towards the first manifold 1004. This tapering of the distribution passageway 1096 promotes uniform radial flow into the bundle of the plurality of hollow fibers 1002, as indicated by arrows 1099.

In the illustrated embodiment, the plurality of vanes 1042 of the impeller 1010 are provided on an end of the rotor magnet 1050 such that the plurality of vanes 1042 are positioned, within the bore 1008 and above an upper surface of the cover 1070. In particular, the plurality of vanes 1042 are positioned within the radial passageway 1094 that is defined between the second end 1092 of the baffle structure 1080 and the upper surface of the cover 1070. Referring back to other embodiments of radial flow impellers, such as the impeller 910 of FIG. 9, the vanes 942 of the impeller 910 extend a substantial length between the first manifold 904 and the second manifold 906 (i.e., the vanes 942 of the impeller 910 have a length that is equal to (or almost equal to) the length between the first manifold 904 and the second manifold 906); however, the vanes 942 may be shorter than what is illustrated in those embodiments. However, in the embodiment of FIG. 10, the plurality of vanes 1042 do not extend the entire length between the first manifold 1004 and the second manifold 1006. Rather, the plurality of vanes 1042 extend from the second manifold 1006 toward the second end 1092 of the baffle structure 1080, and the plurality of vanes 1042 are sized to such that they have a length that is equal to (or almost equal to) the distance between the second end 1092 of the baffle structure 1080 and the upper surface of the cover 1070. Also, the second end 1092 of the baffle structure 1080 may include a taper such that a distance between the second end 1092 and the upper surface of the cover 1070 is greater when evaluated radially inward near the interior flow channel 1082 but is smaller when evaluated radially outward therefrom and nearer to the plurality of hollow fibers 1002. This tapering of the second end 1092 of the baffle structure 1080 defines a pocket or space within which the impeller 1010 is provided, and the plurality of vanes 1042 may have upper edges that are correspondingly tapered with the second end 1092. The tapering of the second end 1092 and the cooperating geometry of the plurality of vanes 1042 arranged within the pocket defined between the second end 1092 and the cover 1070 promote even distribution of the fluid by the impeller 1010 and optimize the ability of the impeller 1010 to radially drive such fluid flow through the radial passageway 1094.

The plurality of vanes 1042 of are arranged such that the impeller 1010 is a radial flow impeller that distributes flow radially outward from the bore 1008. Here, rotation of the impeller 1010 induces fluid flow to enter the inlet conduit 1084 and flow into the interior flow channel 1082 of the baffle structure 1080, as indicated by the arrow 1088, towards the impeller 1010, and the interior flow channel 1082 of the baffle structure 1080 directs (or deposits) the fluid flow into contact with the impeller 1010 which is provided proximate the second manifold 1006. Rotation of the impeller 1010 drives (or redirects) the fluid flow radially outward towards the plurality of hollow fibers 1002 through the radial passageway 1094 that is defined between the second end 1092 of the baffle structure 1080 and the upper surface of the cover 1070. The fluid flow then flows, from the radial passageway 1094, into the distribution passageway 1096 adjacent the bundle of the plurality of hollow fibers 1002, where at least some of the fluid flow may flow towards the first manifold 100 and where the fluid flow is uniformly distributed radially outward through gaps between the plurality of hollow fibers 1002 (and over exterior surfaces of the plurality of hollow fibers 1002), as indicated by arrows 1099. As noted, the tapering of the peripheral surface 1098 of the baffle structure 1080, such that its diameter increases towards the first manifold 1004 (thereby causing the annular thickness of the distribution passageway 1096 to correspondingly decrease towards the first manifold 1004) promotes uniform radial fluid flow through and over the plurality of hollow fibers 1002.

In the illustrated embodiment, the interior flow channel 1082, the radial passageway 1094, and the distribution passageway 1096 are integrated into the membrane separator module 1000 and arranged to receive fluid from exterior the membrane separator module 1000 (e.g., from a tank or reservoir) into the inlet conduit 1084 of the membrane separator module 1000, direct the fluid from the inlet conduit 1084 to the impeller 1010, cooperate with the impeller 1010 to optimize fluid flow, and distribute the fluid flow from the impeller 1010 uniformly into the bundle of the plurality of hollow fibers 1002.

In other embodiments, the second end 1092 of the baffle structure 1080 does not extend through the bore 1008 towards the second manifold 1006 as far as illustrated in FIG. 10. For example, the baffle structure 1080 may extend some other distance through the bore 1008 (e.g., one quarter, half, three quarters, etc.). In embodiments, an axial flow impeller is provided within the inlet conduit 1084 to promote axial flow therethrough. In other embodiments, an impeller (e.g., such as a radial flow impeller) is at least partially arranged in the distribution passageway 1096. For example, a radial flow impeller may be arranged in a top portion of the distribution passageway 1096 proximate the first manifold 1004, or may be arranged in middle region of the distribution passageway 1096 somewhere in between the first manifold 1004 and the second manifold 1006, or may be arranged such that it extends an entire (or almost entire) length of the distribution passageway 1096 between the first manifold 1004 and the second manifold 1006.

Also in the illustrated embodiment, the membrane separator module 1000 includes a bag or liner 1072. The liner 1072 may be disposable and utilized in tank applications to cover an interior surface of a tank (e.g., a cell culture bioreactor tank). In such applications, the liner 1072 separates the tank hardware from the sterile media contained within the liner 1072 and which interacts with the plurality of hollow fibers 1002 of the membrane separator module 1000. In the illustrated embodiment, the liner 1072 is integrally attached (sealed) with the cover 1070. In particular, the liner 1072 may be connected to a peripheral edge or region of a rim 1074 of the cover 1070, such that the liner 1072 extends downward through the second opening 1022 of the second manifold 1006, in-between the second manifold 1006 and the magnetic stator 1052 of the drive unit 1012, thereby creating a sterile barrier between the second manifold 1006 and the magnetic stator 1052. In the illustrate embodiment, the liner 1072 is connected to a bottom side of the rim 1074 of the cover 1070; however, the liner 1072 may be differently attached. With this arrangement, the impeller 1010 which is magnetically driven via the rotor magnet 1050 can be provided inside the liner 1072 to pump fluid flow over the plurality of hollow fibers 1002 (which are also inside the liner 1072) as described herein, while the magnetic stator 1052 of the drive unit 1012 is outside the liner 1072. Also, the cover 1070 separates the rotor magnet 1050 from the magnetic stator 1052. Thus, the cover 1070 and the liner 1072 together form a sterile barrier. The liner 1072 may also be attached to the membrane separator module 1000 at different locations provided the impeller 1010 and the plurality of hollow fibers 1002 are inside the liner 1072, that is, all surfaces of the membrane separator module 1000 that are in contact with the fluid media end-up inside the liner 1072. For example, if the impeller 1010 is driven by a shaft, such as the shaft 240 shown in FIG. 5, the liner 1072 could attach to the second cover 214, at the second opening 222 of the bore 306. The liner 1072 may be attached in multiple configurations as long as the fluid media contacting surfaces of the impeller 1010 and the plurality of hollow fibers 1002 can be separated from the motor or drive unit thereof.

FIGS. 11A and 11B illustrate an embodiment of a membrane separator module 1100 having a shroud 1150 for protecting a plurality of hollow fibers 1102, according to one or more embodiments shown and described herein.

In the illustrated embodiment, the membrane separator module 1100 is similar to the membrane separator modules described above and, therefore, includes a first manifold 1104, a second manifold 1106, and a plurality of hollow fibers 1102 extending between the first manifold 1104 and the second manifold 1106, wherein the plurality of hollow fibers 1102 are bundled as an annulus (i.e., the plurality of hollow fibers 1102 are organized as an annular shaped bundle) and define a bore 1108 of the membrane separator module 1100 that extends between a first opening 1120 in the first manifold 1104 and a second opening 1122 in the second manifold 1106. Also, it should be appreciated that, while not illustrated, the membrane separator module 1100 includes an impeller having a plurality of vanes, and such impeller may be provided as described above.

The first manifold 1104 includes a first cover 1110 and a first plate 212. Similarly, the second manifold 206 includes a second cover 214 and a second plate 216. Where utilized, the shroud 1150 may be embedded or retained within the first plate 212 of the first manifold 1104 and the second plate 216 of the second manifold 206.

In the illustrated embodiment, the shroud 1150 extends between the first manifold 1104 and the second manifold 1106 and includes an outer cover 1152 and an inner cover 1154. The outer cover 1152 includes a first end proximate to the first manifold 1104 that is retained within the first plate 1112 of the first manifold 1104, and the outer cover 1152 includes a second end proximate to the second manifold 1106 that is retained within the second plate 1116 of the second manifold 1106. Similarly, the inner cover 1154 includes a first end proximate to the first manifold 1104 that is retained within the first plate 1112 of the first manifold 1104, and the inner cover 1154 includes a second end proximate to the second manifold 1106 that is retained within the second plate 1116 of the second manifold 1106. However, the outer cover 1152 and/or the inner cover 1154 may be differently retained or supported, for example, the inner cover 1154 may be attached within the first opening 1120 and the second opening 1122 of the first manifold 1104 and the second manifold 1106, respectively (e.g., on an inner peripheral surface of the first opening 1120 and the second opening 1122), and/or the outer cover 1152 may be retained or supported on an outer periphery 1156 of the first manifold 1104 and on an outer periphery 1158 the second manifold 1106, respectively.

The plurality of hollow fibers 1102 are organized as an annular shaped bundle of fibers and the outer cover 1152 is disposed over an outer side of the annular shaped bundle and the inner cover 1154 is disposed within the bore 1108 and over an inner side of the annular shaped bundle. While the illustrated embodiment of the shroud 1150 includes both the inner cover 1154 and the outer cover 1152, in other embodiments the shroud 1150 may include either the inner cover 1154 or the outer cover 1152. The inner cover 1154 and the outer cover 1152 may be made from the same or different materials, including but not limited to perforated tubes, extruded rigid mesh tube, or extruded cylindrical netting tube, etc. Because the plurality of hollow fibers 1102 may be fragile and easily nicked or broken, the shroud 1150 functions to shield them from contacting the impeller or other surfaces in a tank environment.

Various embodiments of membrane separator modules have been described herein. In embodiments, membrane separator modules may be utilized. For example, in tank applications, multiple membrane separator modules may be placed in a reservoir to accomplish a separation on the fluid in the reservoir, which may not otherwise be possible or efficient to perform with a single membrane separator module. Indeed, it is possible to place multiple membrane separator module in very large and substantially infinite reservoirs, such as in the open air and water, to accomplish separations such as particle filtration and gas transfer (such as VOC removal).

Accordingly, utilization of membrane separator modules as described herein will allow for the elimination of various otherwise standard components, such as external tubing, pumps, blowers, etc. Thus, membrane separator modules simplify the process and minimize the number of components needed to perform a membrane separation on a fluid contained in a tank. Also, membrane separator modules described herein reduce the fluid pressure and shear exposure needed to accomplish a membrane separation on a fluid contained in a tank. Further, membrane separator modules described herein optimize flow uniformity through a bundle of hollow fibers to thereby improve the membrane separation performance on a fluid contained in a tank.

Embodiments of membrane separator modules described herein combine and integrate a bundle hollow fiber membrane with an impeller to drive the fluid to thereby perform a membrane separation on the fluid contained in a tank. Moreover, membrane separator modules described herein maintain fluid circulation in the tank driven by the impeller which promotes recirculation and mixing of the fluid in the tank. Furthermore, embodiments of Embodiments of membrane separator modules described herein are compact and contain within themselves the bundle of integrated hollow fiber membranes to perform a membrane separation on the fluid contained in a vessel or tank.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A membrane separator system, comprising:
  a reservoir for containing a liquid;
  a membrane separator module disposed in the reservoir so as to be submerged in the liquid, the membrane separator module comprising;
    a plurality of hollow fibers arranged as an annular shaped bundle having a first end and a second end opposite the first end, the annular shaped bundle defining a bore extending between the first end and the second end, wherein each of the plurality of hollow fibers includes a lumen extending between the first end and the second end;
    a first manifold attached to the plurality of hollow fibers at the first end of the annular shaped bundle and a second manifold attached to the plurality of hollow fibers at the second end of the annular shaped bundle, the first manifold having a first interior volume that is in fluid communication with the lumens of the plurality of hollow fibers and the second manifold having a second interior volume that is in fluid communication with the lumens of the plurality of hollow fibers, the first manifold and the second manifold each being annular shaped and having an opening, with the opening of the first manifold in communication with the first end of the bore and the opening of the second manifold in communication with the second end of the bore;

a fluid inlet port disposed on the first manifold and in fluid communication with the first interior volume thereof, and a fluid outlet port disposed on the second manifold and in fluid communication with the second interior volume thereof, wherein a fluid path is defined through the inlet port, the first interior volume, the lumens of the plurality of hollow fibers, the second interior volume, and the outlet port;

an impeller at least partially arranged in the bore of the annular shaped bundle and/or in either or both of the openings of the first manifold and the second manifold, the impeller operable to drive fluid flow exterior the plurality of hollow fibers;

a baffle structure disposed in the bore of the annular shaped bundle of hollow fibers; an annulus-shaped distribution passageway defined between a peripheral surface of the baffle structure and an interior side of the plurality of hollow fibers which define the bore, the annulus-shaped distribution passageway having a tapered geometry with a ring thickness that decreases from one of the ends of the annular shaped bundle of hollow fibers to an other of the ends of the annular shaped bundle of hollow fibers such that the tapered geometry encourages uniform radial flow of the liquid from the reservoir through the annular shaped bundle of hollow fibers.

2. The membrane separator system of claim 1, further comprising a motor operatively connected to a shaft of the impeller for causing rotation of the impeller.

3. The membrane separator system of claim 1, wherein the impeller includes a plurality of vanes arranged in the opening of the first manifold.

4. The membrane separator system of claim 3, wherein the vanes are arranged to drive fluid flow into the bore, through the opening of the first manifold.

5. The membrane separator system of claim 1, wherein the impeller includes a plurality of vanes arranged in the bore.

6. The membrane separator system of claim 5, wherein the vanes cooperate with the baffle structure to drive fluid flow radially outward through the plurality of hollow fibers from the bore.

7. The membrane separator system of claim 1, wherein the impeller includes a shaft and a rotor magnet connected to the shaft, and the membrane separator module further comprises:

a magnetic stator provided proximate the first manifold or the second manifold, wherein the magnetic stator surrounds the rotor magnet.

8. The membrane separator system of claim 7, further comprising a cover provided between the magnetic stator and the rotor magnet.

9. The membrane separator system of claim 8, wherein magnetic stator is provided proximate the second manifold, and the cover is integral with or sealed to the second manifold.

10. The membrane separator system of claim 8, further comprising a liner connected to the cover and provided between the magnetic stator and either the first manifold or the second manifold.

11. The membrane separator system of claim 1, wherein the plurality of hollow fibers comprises at least a first type of hollow fibers and a second type of hollow fibers.

12. The membrane separator system of claim 11, wherein the first type of hollow fibers are arranged concentrically within the second type of hollow fibers, wherein the second type of hollow fibers are positioned radially outward from the first type of hollow fibers.

13. The membrane separator system of claim 11, wherein, when evaluated in cross-section, the first type of hollow fibers and the second type of hollow fibers are uniformly distributed within the annular shaped bundle.

14. The membrane separator system of claim 11, wherein, when evaluated in cross-section, a density of the second type of hollow fibers organized within first type of hollow fibers varies when evaluated in a radial direction from the bore.

15. The membrane separator system of claim 14, wherein the density of the second type organized within first type of hollow fibers increases along the radial direction.

16. The membrane separator system of claim 1, wherein, when evaluated in cross-section, a density of the plurality of hollow fibers increases along a radial direction from the bore.

17. The membrane separator system of claim 1, further comprising a shroud extending between the first manifold and the second manifold, the shroud having an outer cover and an inner cover, the outer cover disposed over an outer side of the annular shaped bundle and the inner cover disposed within the bore and over the inner side of the annular shaped bundle, the distribution passageway being defined between the peripheral surface of the baffle structure and inner cover.

18. The membrane separator system of claim 1, wherein the baffle structure further defines an interior flow channel, the baffle structure is sealed within either the first opening of the first manifold or the second opening of the second manifold such that the baffle structure extends through the bore towards the second manifold or the first manifold, respectively, wherein the interior flow channel directs fluid flow into contact with the impeller which is provided proximate the second manifold or the first manifold.

19. The membrane separator system, comprising:
a reservoir for containing a liquid;
a membrane separator module disposed in the reservoir so as to be submerged in the liquid, the membrane separator module comprising;
a plurality of hollow fibers arranged as an annular shaped bundle having a first end and a second end opposite the first end, the annular shaped bundle defining a bore extending between the first end and the second end, wherein each of the plurality of hollow fibers includes a lumen extending between the first end and the second end;
a first manifold attached to the plurality of hollow fibers at the first end of the annular shaped bundle and a second manifold attached to the plurality of hollow fibers at the second end of the annular shaped bundle, the first manifold having a first interior volume that is in fluid communication with the lumens of the plurality of hollow fibers and the second manifold having a second interior volume that is in fluid communication with the lumens of the plurality of hollow fibers, the first manifold and the second manifold each being annular shaped and having an opening, with the opening of the first manifold in communication with the first end of the bore and the opening of the second manifold in communication with the second end of the bore;

a fluid inlet port disposed on the first manifold and in fluid communication with the first interior volume thereof, and a fluid outlet port disposed on the second manifold and in fluid communication with the second interior volume thereof, wherein a fluid path is defined through the inlet port, the first interior volume, the lumens of the plurality of hollow fibers, the second interior volume, and the outlet port;

a baffle structure disposed in the bore of the annular shaped bundle of hollow fibers; an annulus-shaped distribution passageway defined between a peripheral surface of the baffle structure and an interior side of the plurality of hollow fibers which define the bore, the annulus-shaped distribution passageway having a tapered geometry with a ring thickness that decreases from one of the ends of the annular shaped bundle of hollow fibers to an other of the ends of the annular shaped bundle of hollow fibers;

a cover at one of the manifolds, the cover having a surface spaced from an end of the baffle structure to define a radial passageway;

an impeller comprising at least one vane arranged in the radial passageway;

a drive unit connected to the impeller;

wherein the baffle structure, cover, and impeller cooperate to encourage flow of the liquid from the radial passage way and into the tapered geometry so as to encourage uniform radial flow of the liquid from the reservoir through the annular shaped bundle of hollow fibers.

\* \* \* \* \*